United States Patent
Zhang et al.

(10) Patent No.: US 12,088,534 B2
(45) Date of Patent: Sep. 10, 2024

(54) INDICATION OF BANDWIDTH PART AND FULL DUPLEX RESOURCES FOR BASE STATION IN FULL-DUPLEX MODE

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/647,967

(22) Filed: Jan. 13, 2022

(65) Prior Publication Data

US 2023/0224136 A1    Jul. 13, 2023

(51) Int. Cl.
*H04L 5/00* (2006.01)
*H04L 5/14* (2006.01)
*H04L 5/16* (2006.01)
*H04W 72/08* (2009.01)
*H04W 72/541* (2023.01)
*H04W 88/10* (2009.01)

(52) U.S. Cl.
CPC .......... *H04L 5/0094* (2013.01); *H04L 5/1461* (2013.01); *H04L 5/16* (2013.01); *H04W 72/541* (2023.01); *H04W 88/10* (2013.01)

(58) Field of Classification Search
CPC ....... H04L 5/0094; H04L 5/1461; H04L 5/16; H04W 72/541; H04W 88/10
See application file for complete search history.

(56) References Cited

U.S. PATENT DOCUMENTS

| | | | | |
|---|---|---|---|---|
| 2019/0239245 A1* | 8/2019 | Davydov | .............. | H04L 5/0048 |
| 2019/0274162 A1* | 9/2019 | Zhang | .............. | H04W 74/0808 |
| 2019/0306848 A1* | 10/2019 | Zhou | ..................... | H04W 72/20 |
| 2020/0107361 A1* | 4/2020 | Mukherjee | ............ | H04W 74/04 |
| 2020/0260450 A1* | 8/2020 | Ji | ......................... | H04L 5/0091 |
| 2020/0275391 A1* | 8/2020 | Guo | ..................... | H04L 41/0806 |
| 2020/0280971 A1* | 9/2020 | Moon | .................. | H04L 5/0053 |
| 2021/0021450 A1* | 1/2021 | Zhang | ................ | H04L 27/2636 |

(Continued)

OTHER PUBLICATIONS

International Search Report and Written Opinion—PCT/US2023/010401—ISA/EPO—Jun. 14, 2023.

(Continued)

*Primary Examiner* — Bailor C Hsu
(74) *Attorney, Agent, or Firm* — Procopio, Cory, Hargreaves & Savitch LLP

(57) ABSTRACT

The apparatus may be configured to configure a downlink BWP and an uplink BWP having at least one of a restricted uplink portion, a restricted downlink portion, or a guard band associated with one or more of the downlink BWP or the uplink BWP. The apparatus may also be configured to communicate with one or more UEs in the restricted downlink portion of the downlink BWP and the restricted uplink portion of the uplink BWP. The apparatus may be configured to transmit, to a first UE in a half-duplex mode of operation, an indication of a first set of resources for a full-duplex mode of operation of the base station and a second set of resources for the half-duplex mode of operation of the base station. The apparatus may also be configured to communicate with the first UE in the indicated first set of resources.

16 Claims, 19 Drawing Sheets

(56) References Cited

U.S. PATENT DOCUMENTS

| | | | |
|---|---|---|---|
| 2021/0152418 A1 | 5/2021 | Abdelghaffar et al. | |
| 2021/0194663 A1 | 6/2021 | Abotabl et al. | |
| 2021/0307010 A1* | 9/2021 | Abotabl | H04L 5/14 |
| 2021/0314946 A1* | 10/2021 | Ang | H04L 5/001 |
| 2021/0336759 A1 | 10/2021 | Abdelghaffar et al. | |
| 2021/0377938 A1* | 12/2021 | Huang | H04W 72/1263 |
| 2021/0400654 A1 | 12/2021 | Ibrahim et al. | |
| 2022/0078728 A1* | 3/2022 | Yi | H04W 48/16 |
| 2022/0086029 A1* | 3/2022 | Abotabl | H04L 27/2605 |
| 2022/0182160 A1* | 6/2022 | Su | H04B 17/309 |

OTHER PUBLICATIONS

Partial International Search Report—PCT/US2023/010401—ISA/EPO—Apr. 24, 2023.

\* cited by examiner

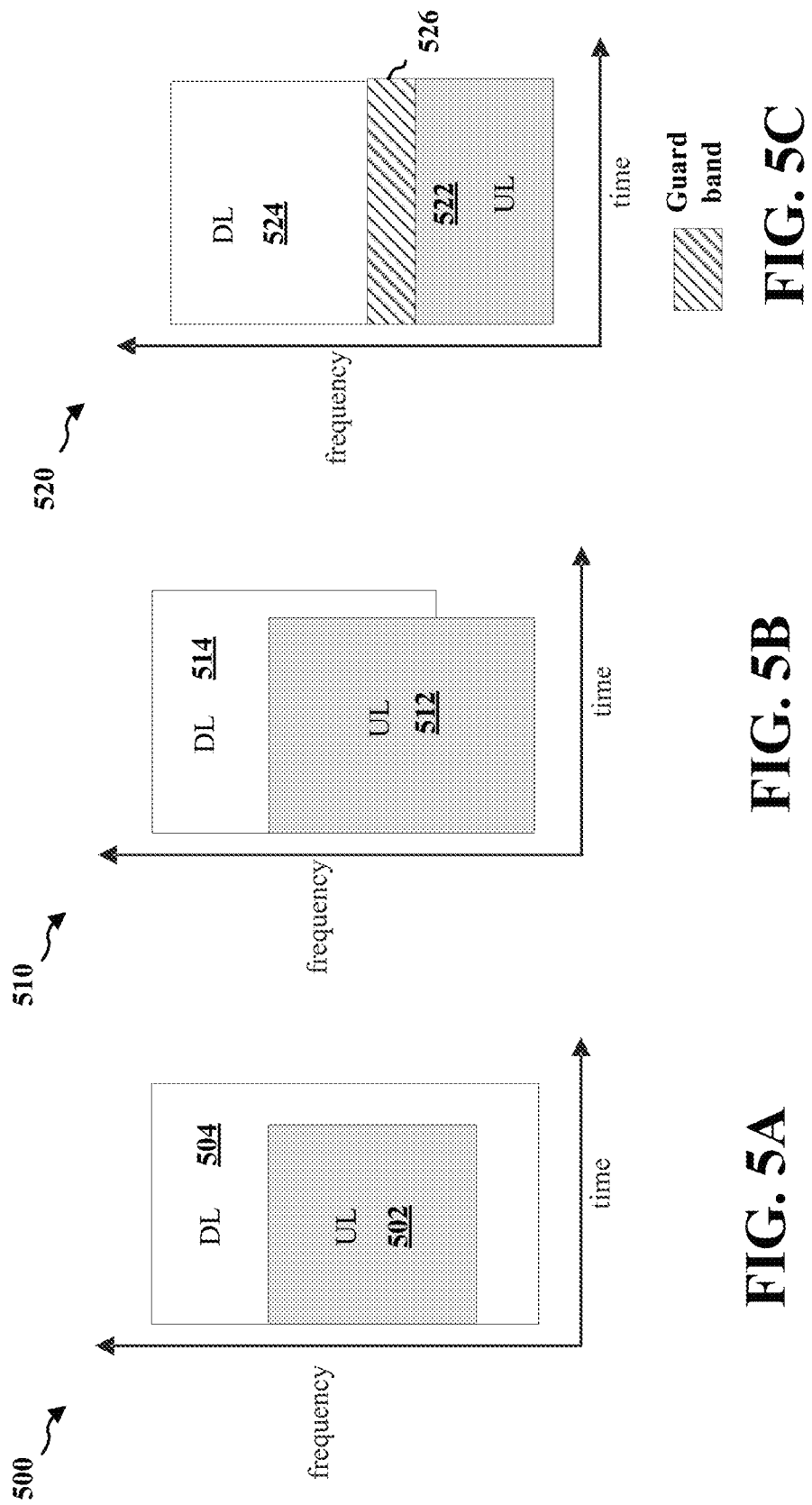

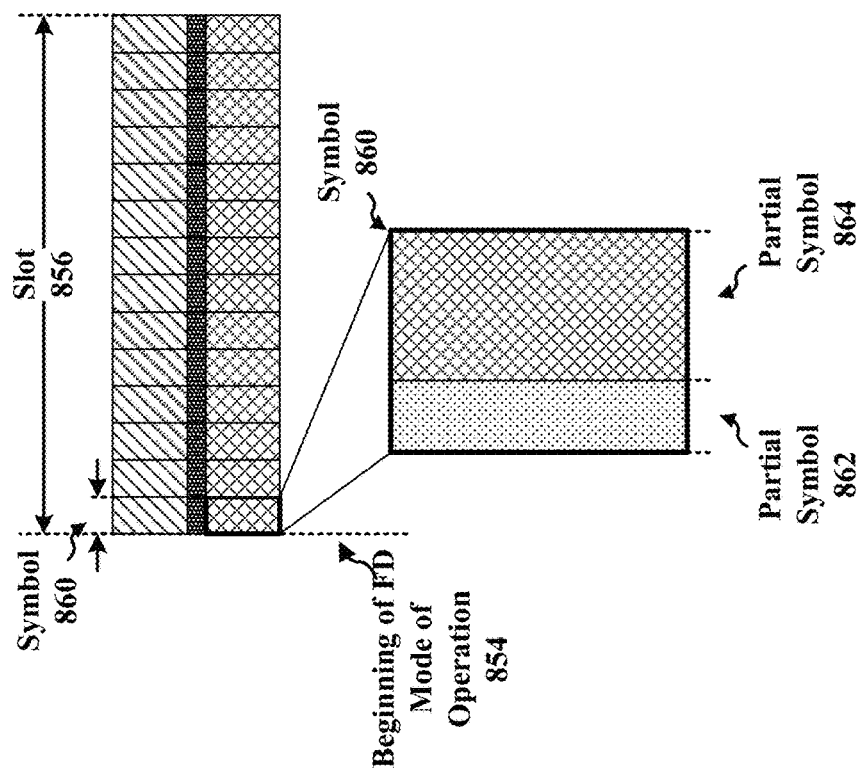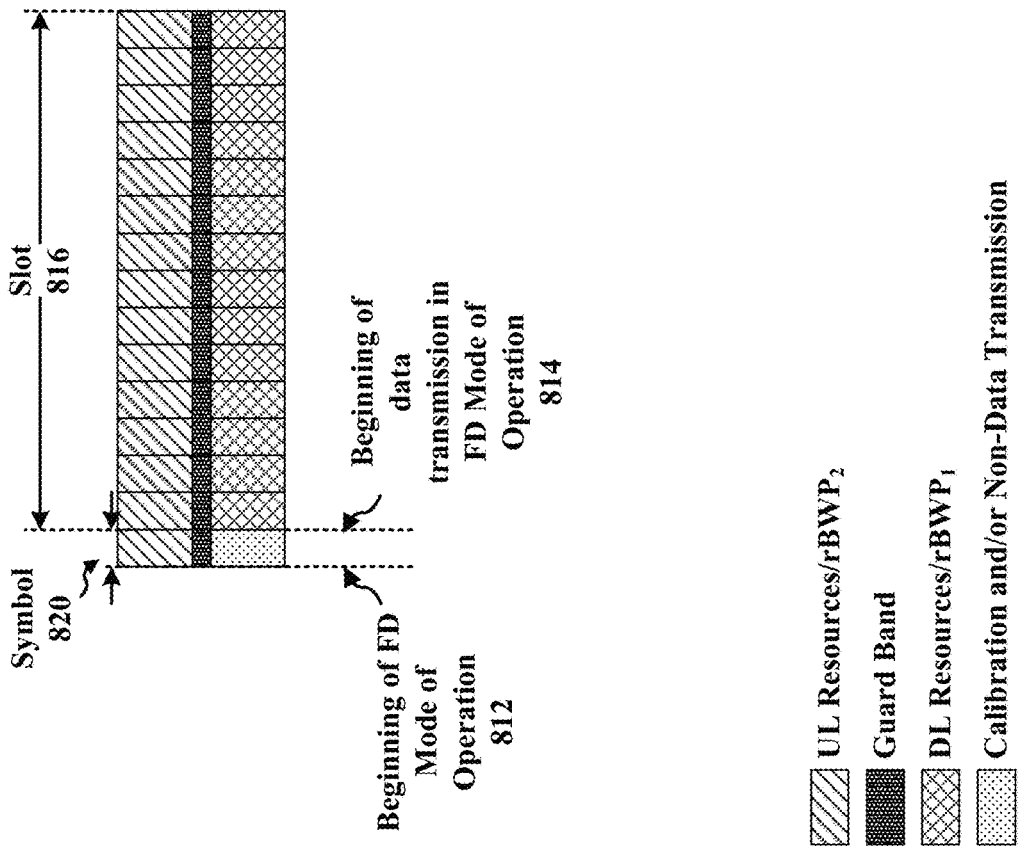

INDICATION OF BANDWIDTH PART AND FULL DUPLEX RESOURCES FOR BASE STATION IN FULL-DUPLEX MODE

TECHNICAL FIELD

The present disclosure relates generally to communication systems, and more particularly, to indicating resources (e.g., one or more bandwidth parts (BWPs) and/or other resources) or parameters associated with full-duplex (FD) communication at a base station with one or more user equipments (UEs) operating in a half-duplex (HD) mode.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus may be configured to configure a downlink BWP and an uplink BWP having at least one of a restricted uplink portion, a restricted downlink portion, or a guard band associated with one or more of the downlink BWP or the uplink BWP. The apparatus may also be configured to communicate with one or more UEs in the restricted downlink portion of the downlink BWP and the restricted uplink portion of the uplink BWP.

In an aspect of the disclosure, a method, a computer-readable medium, and an apparatus are provided for wireless communication at a base station. The apparatus may be configured to transmit, to a first UE in a half-duplex mode of operation, an indication of a first set of resources for a full-duplex mode of operation of the base station and a second set of resources for the half-duplex mode of operation of the base station. The apparatus may also be configured to communicate with the first UE in the indicated first set of resources.

In an aspect of the disclosure, a method, a computer-readable medium, and an apparatus are provided for wireless communication at a UE. The apparatus may be configured to receive, from a base station, a configuration of a downlink BWP and an uplink BWP having at least one of a restricted uplink portion, a restricted downlink portion, or a guard band associated with one or more of the downlink BWP or the uplink BWP. The apparatus may also be configured to communicate with the base station in one or more of the restricted downlink portion of the downlink BWP or the restricted uplink portion of the uplink BWP.

In an aspect of the disclosure, a method, a computer-readable medium, and an apparatus are provided for wireless communication at a UE. The apparatus may be configured to receive, from a base station, a first set of parameters for a full-duplex mode of the base station. The apparatus may also be configured to receive, from the base station, an indication of a first set of resources associated with the first set of parameters for the full-duplex mode of the base station. The apparatus may also be configured to communicate with the base station via the indicated first set of resources based on the first set of parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A illustrates a first example of in-band full duplex (IBFD) resources in accordance with various aspects of the present disclosure.

FIG. 5B illustrates a second example of IBFD resources in accordance with various aspects of the present disclosure.

FIG. 5C illustrates an example of sub-band full-duplex resources in accordance with various aspects of the present disclosure.

FIG. 8A illustrates a slot and/or symbol structure associated with a full-duplex mode of operation in accordance with various aspects of the present disclosure.

FIG. 8B illustrates a slot and/or symbol structure associated with a full-duplex mode of operation in accordance with various aspects of the present disclosure.

DETAILED DESCRIPTION

Figure 1:
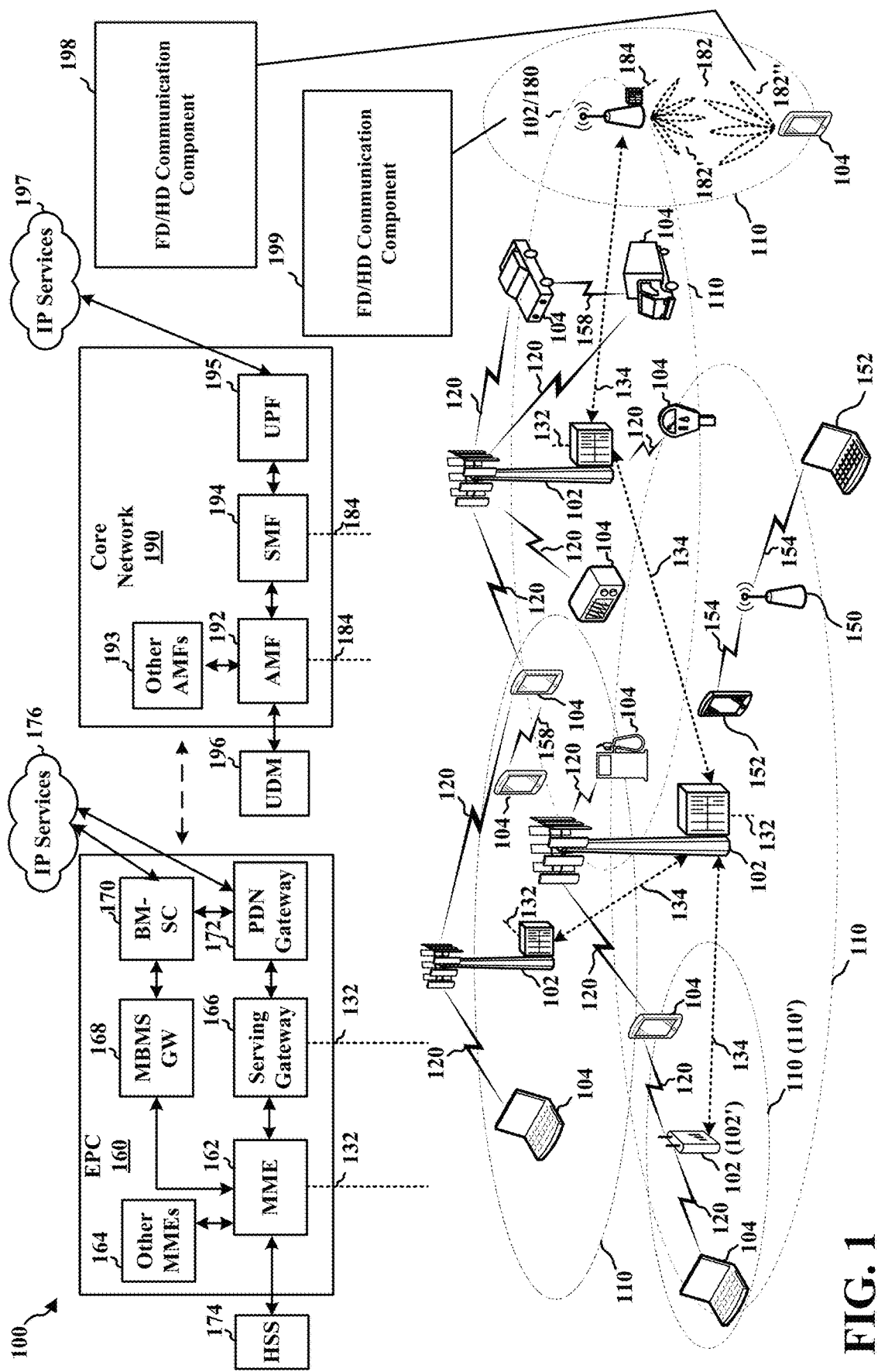
FIG. 1 is a diagram illustrating an example of a wireless communications system and an access network in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured with a FD/HD communication component 198 that may be configured to receive, from a base station, a configuration of a downlink BWP and an uplink BWP having at least one of a restricted uplink portion, a restricted downlink portion, or a guard band associated with one or more of the downlink BWP or the uplink BWP; and communicate with the base station in one or more of the restricted downlink portion of the downlink BWP or the restricted uplink portion of the uplink BWP. The FD/HD communication component 198, in some aspects, may be configured to receive, from a base station, a first set of parameters for a full-duplex mode of the base station; receive, from the base station, an indication of a first set of resources associated with the first set of parameters for the full-duplex mode of the base station; and communicate with the base station via the indicated first set of resources based on the first set of parameters.

In certain aspects, the base station 180 may be include a FD/HD communication component 199 configured to configure a downlink BWP and an uplink BWP having at least one of a restricted uplink portion, a restricted downlink portion, or a guard band associated with one or more of the downlink BWP or the uplink BWP; and communicate with one or more UEs in the restricted downlink portion of the downlink BWP and the restricted uplink portion of the uplink BWP. In some aspects, the FD/HD communication component 199 may be configured to transmit, to a first UE in a half-duplex mode of operation, an indication of a first set of resources for a full-duplex mode of operation of the base station and a second set of resources for the half-duplex mode of operation of the base station; and communicate with the first UE in the indicated first set of resources. Although the following description may be focused on 5G NR, the concepts described herein may be applicable to other similar areas, such as LTE, LTE-A, CDMA, GSM, and other wireless technologies.

Figure 2:
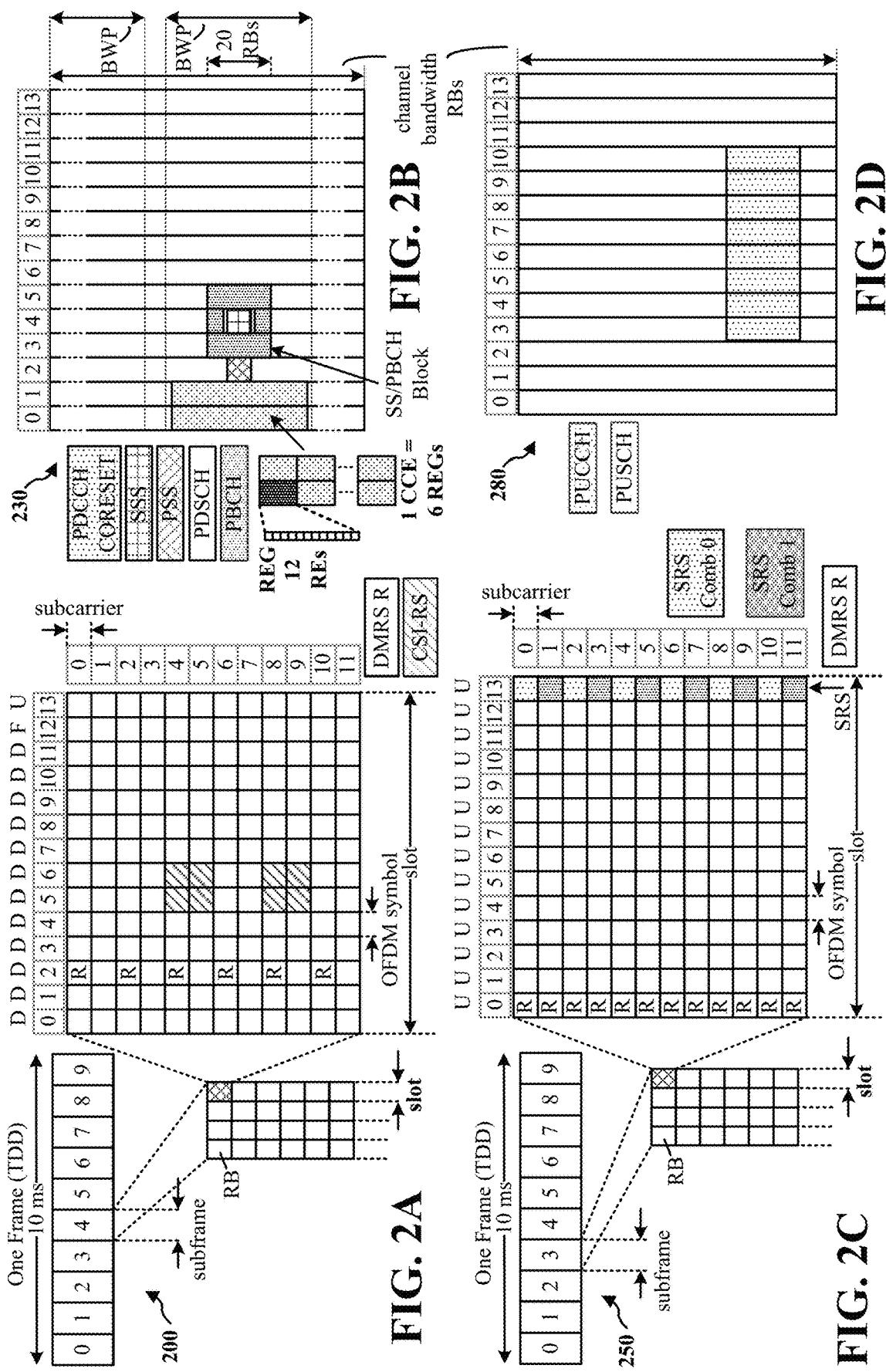
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
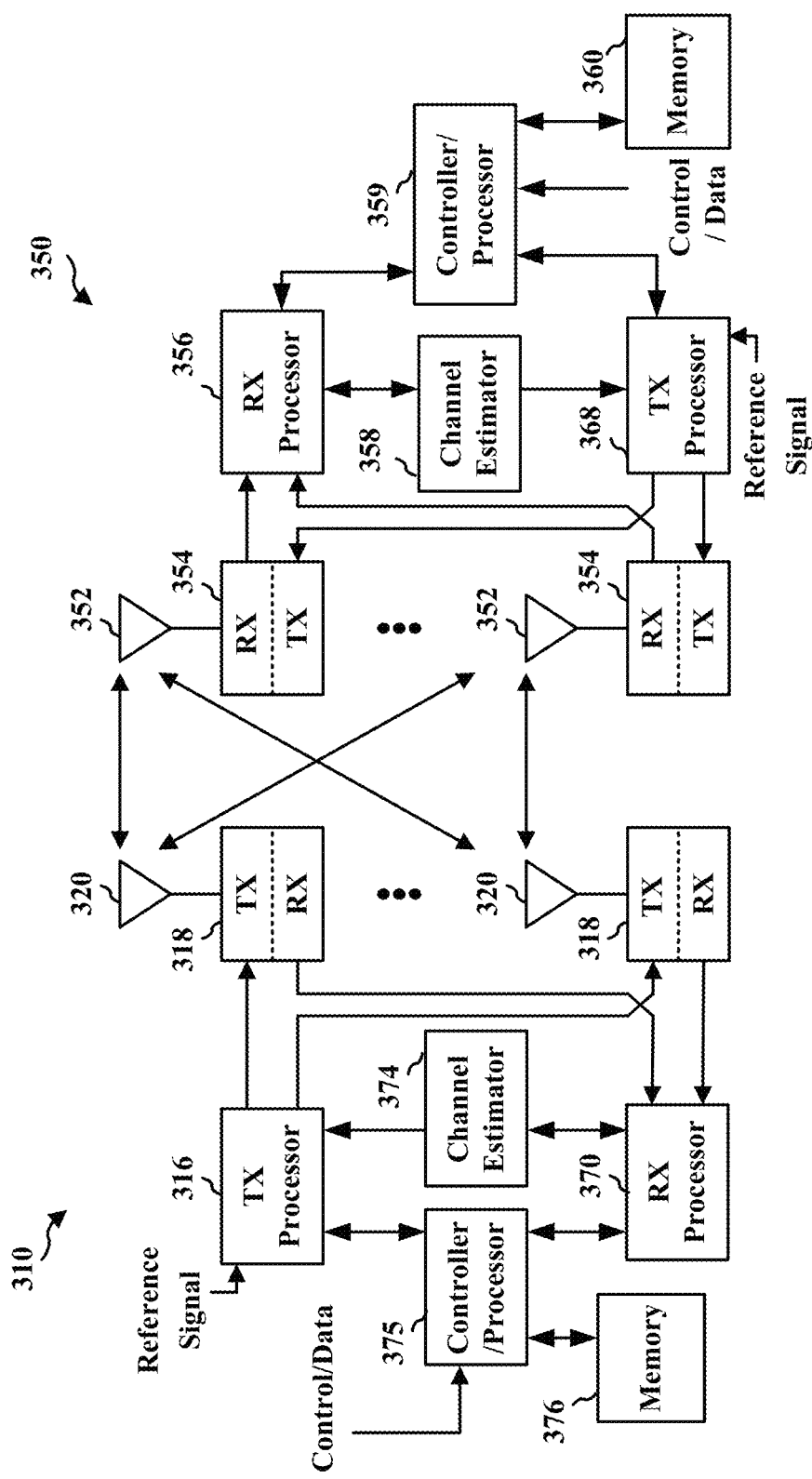
FIG. 3 is a diagram illustrating an example of a base station and user equipment (UE) in an access network in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter at RX/TX 318. Each transmitter at RX/TX 318 may modulate a radio frequency (RF) carrier with a respective spatial stream for transmission.

At the UE 350, each receiver at RX/TX 354 receives a signal through its respective antenna 352. Each receiver at RX/TX 354 recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310.

These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters at RX/TX 354. Each transmitters at RX/TX 354 may modulate an RF carrier with a respective spatial stream for transmission.

The UL transmission is processed at the base station 310 in a manner similar to that described in connection with the receiver function at the UE 350. Each receiver at RX/TX 318 receives a signal through its respective antenna 320. Each receiver at RX/TX 318 recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

In some aspects of wireless communication, a base station may engage in FD communication with one or more UEs. The base station (or the UE) may engage in FD communication based on DL transmission (or reception) via a first antenna or panel and UL reception (or transmission) via a second antenna or panel. The base station, in some aspects, may transmit DL transmissions to a first UE operating in half-duplex (HD) mode and receive UL transmissions from a second UE operating in a half-duplex mode. In some aspects, the capacity for FD operation may be affected by self-interference from the DL transmission to UL reception.

Figure 4A:
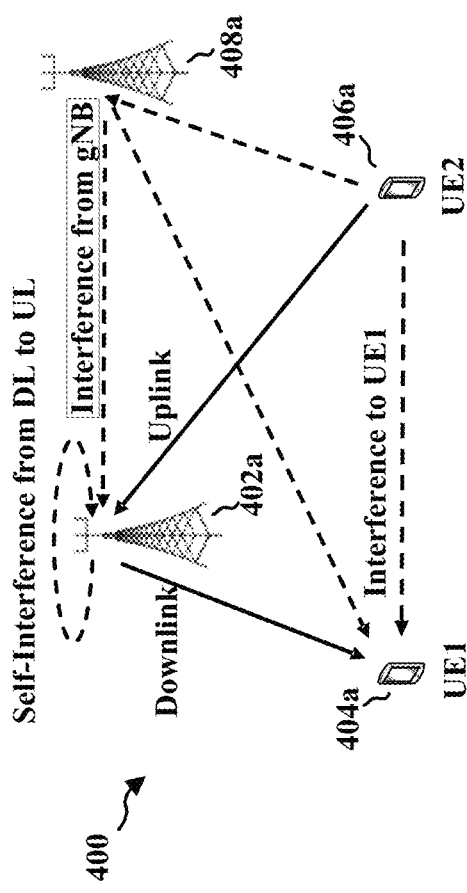
FIG. 4A shows a first example of full-duplex communication in which a first base station is in full duplex communication with a first UE and a second UE in accordance with various aspects of the present disclosure.
Figure 4C:
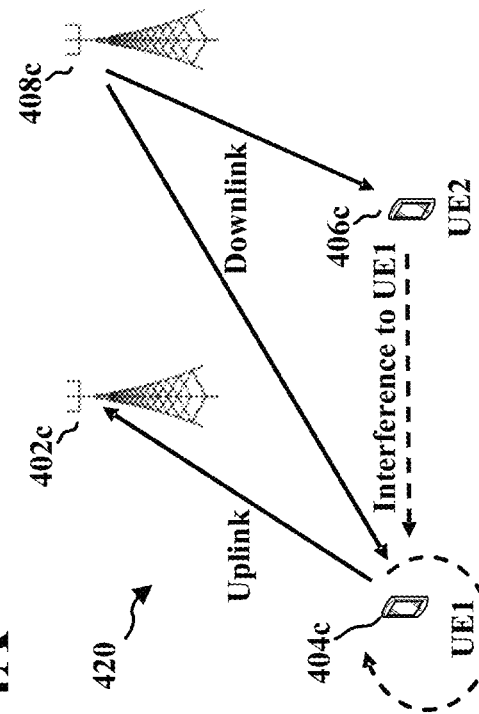
FIG. 4C shows a third example of full-duplex communication in which a first UE is a full-duplex UE in communication with a first base station and a second base station in accordance with various aspects of the present disclosure.
Figure 4B:
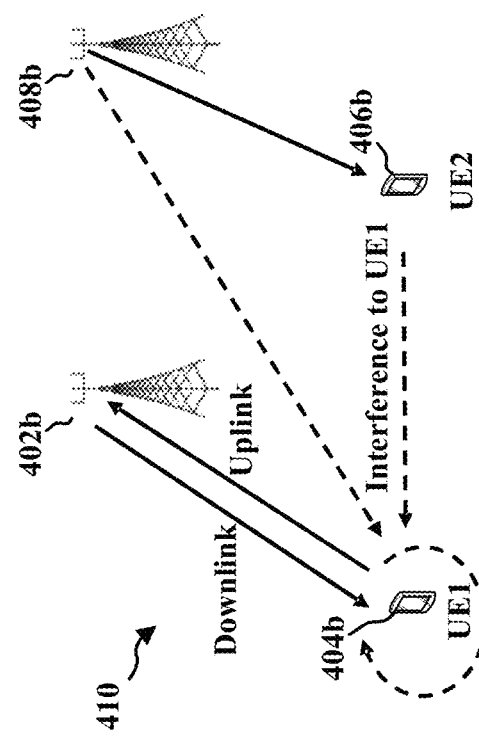
FIG. 4B shows a second example of full-duplex communication in which a first base station is in full-duplex communication with a first UE in accordance with various aspects of the present disclosure.

FIGS. 4A-4C illustrate various modes of full-duplex communication in accordance with various aspects of the present disclosure. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a in accordance with various aspects of the present disclosure. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b in accordance with various aspects of the present disclosure. In this example, the first base station 402b is a full-duplex base station and the first UE 404b is a full-duplex UE. The first base station 402b and the UE 404b that can concurrently receive and transmit communication that overlaps in time in a same frequency band. The base station and the UE may each experience self-interference, in which a transmitted signal from the device is leaked to a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c in accordance with various aspects of the present disclosure. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c.

FIGS. 5A-5B illustrate a first example 500 and a second example 510 of in-band full duplex (IBFD) resources in accordance with various aspects of the present disclosure. FIG. 5C illustrates an example 520 of sub-band full-duplex resources in accordance with various aspects of the present disclosure. In IBFD, signals may be transmitted and received in overlapping times and via overlapping frequencies. As shown in the first example 500, a time and a frequency allocation of UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band FDD, where uplink and downlink resources may overlap in time using different frequencies, as shown in FIG. 5C. As shown in FIG. 5C, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and DL resources that are immediately adjacent to each other correspond to a guard band width of 0. As an output signal, e.g., from a UE (or base station) transmitter may extend outside the UL resources, the guard band may reduce interference experienced by the UE. Sub-band FDD may also be referred to as "flexible duplex".

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full duplex resources) or may occur in adjacent or slightly separated frequency resources, such as shown in FIG. 5C (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols.

Figure 6:
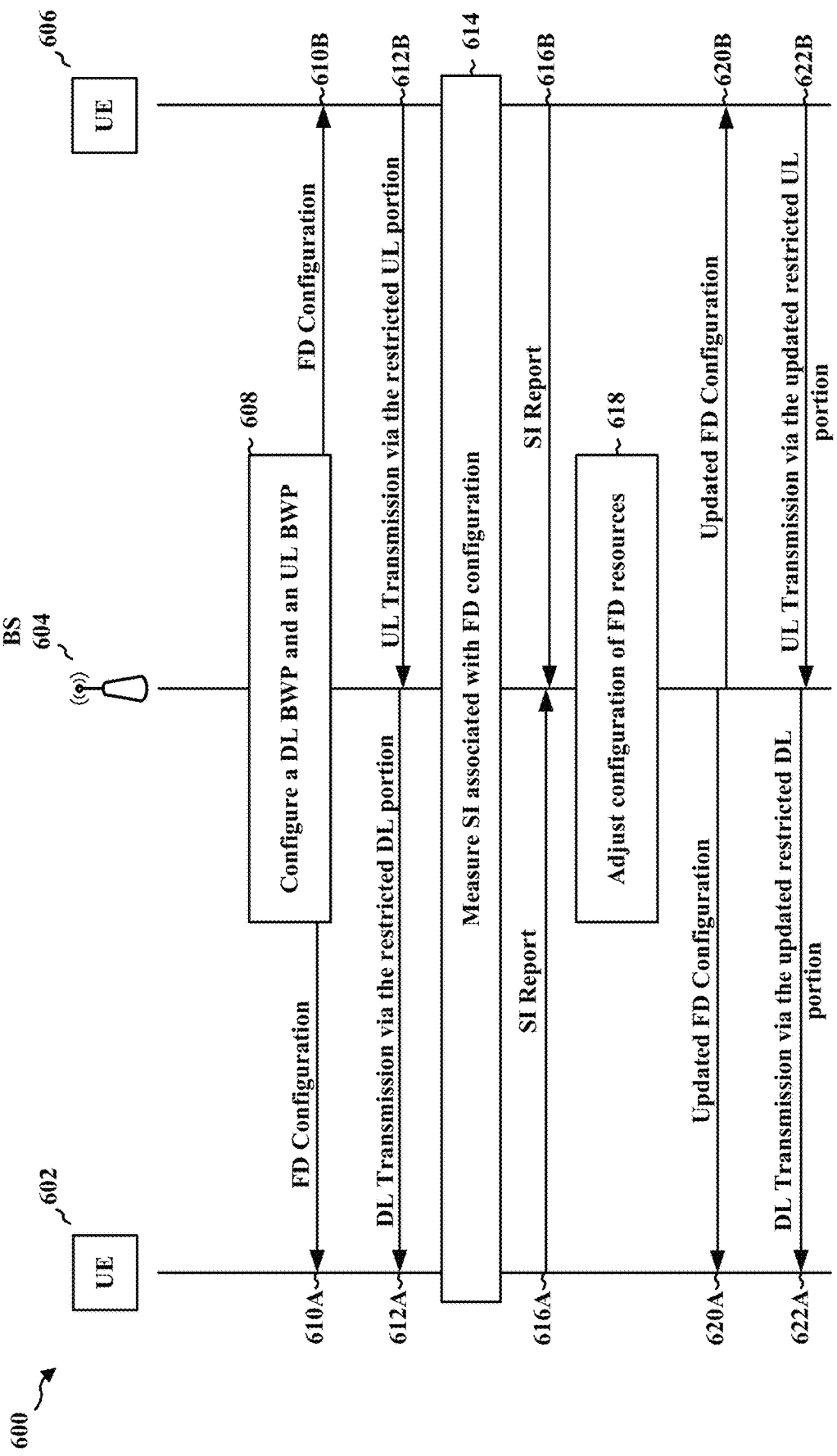
FIG. 6 is a call flow diagram illustrating a method of wireless communication in accordance with various aspects of the present disclosure.

FIG. 6 is a call flow diagram 600 illustrating a method of wireless communication in accordance with various aspects of the present disclosure. Diagram 600 illustrates a base station 604 communicating with a first UE 602 and a second UE 606. In some aspects, the base station 604 may operate in a full-duplex mode while the first UE 602 and the second UE 606 operate in a half-duplex mode. For example, during a first time period, a base station 604 operating in a full-duplex mode may transmit, and the first UE 602 may receive, a DL transmission (e.g., DL transmission 612A or 622A) and may receive, and the second UE 606 may transmit, an UL transmission (e.g., UL transmission 612B or 622B). In some aspects, one of more of the first UE 602 or the second UE 606 may operate in a full-duplex mode.

Figure 19:
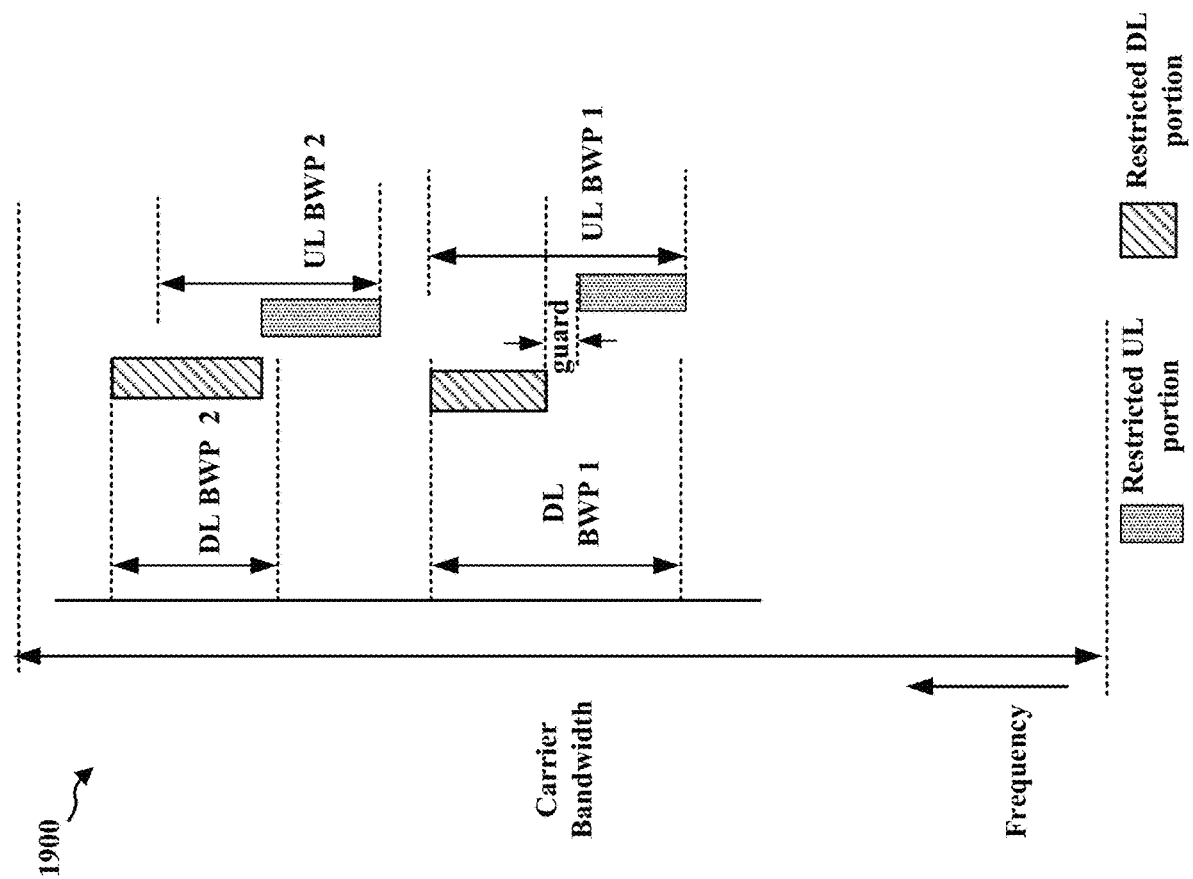
FIG. 19 illustrates an example frequency resource diagram including BWPs that include restricted resources, in accordance with various aspects of the present disclosure.

A carrier bandwidth may span a contiguous set of PRBs, e.g., from common resources blocks for a given numerology on a given carrier. A base station may configure one or more bandwidth parts (BWPs) that have a smaller bandwidth span than the carrier bandwidth. One or more of the BWPs may be configured for downlink communication, and may be referred to as a downlink (DL) BWP. FIG. 19 illustrates a frequency resource diagram 1900 showing multiple BWPs (e.g., DL BWP 1, DL BWP 2, an UL BWP 1, and an UL BWP 2) configured within a frequency span of the carrier bandwidth. One DL BWP may be active at a time, and the UE may not be expected to receive PDSCH, PDCCH, CSI-RS, or TRS outside of an active BWP without a measurement gap or BWP switching gap. Each DL BWP may include at least one control resource set (CORESET). One or more of the BWPs may be configured for uplink communication, and may be referred to as an uplink (UL) BWP. One UL BWP may be active at a time for the UE, and the UE may not transmit PUSCH or PUCCH outside of the active BWP. The use of a BWP may reduce the bandwidth monitored by the UE and/or used for transmissions, which may help the UE to save battery power.

The base station 604 may indicate restricted resources, e.g., which may correspond to the resources that the base station uses for full-duplex communication. The base station may configure a UE with a BWP and may further indicate a set of restricted resources within the BWP. For example, the base station 604 may configure a downlink BWP for a UE and may further indicate a restricted subset of resources in the downlink BWP that the UE may use for downlink reception. Similarly, the base station 604 may configure the UE with an uplink BWP and may indicate a restricted subset of resources in the uplink BWP for the UE to use for uplink transmission. The restricted subset of resources within the uplink BWP and/or the downlink BWP may help the UE to avoid interference that may be caused due to a full-duplex operation of the base station. FIG. 19 illustrates examples of restricted resources within the example DL BWPs and UL BWPs. The base station 604 may configure 608 a downlink BWP and an uplink BWP having at least one of a restricted uplink portion, a restricted downlink portion, or a guard band associated with one or more of the downlink BWP or the uplink BWP. In some aspects, the downlink BWP and the uplink BWP may be a same BWP, overlapping BWPs, or disjoint BWPs. For example, FIG. 19 illustrates that DL BWP 1 may fully overlap in frequency with the UL BWP 1, DL BWP 1 is separated in frequency from UL BWP 2, and UL BWP 2 is partially overlapping in the frequency domain with the DL BWP 2. For a restricted downlink portion and a restricted uplink portion in a fully overlapping BWP (e.g., where the downlink BWP and the uplink BWP span a same bandwidth), the restricted downlink portion and the restricted uplink portion may be one of overlapping or disjoint (e.g., be separated by a guard band or be adjacent). For an initial configuration, the restricted downlink portion and the restricted uplink portion may be separated by a default (or preconfigured) guard band of a positive, negative, or zero width associated with disjoint, overlapping, or adjacent restricted portions, respectively. An initial configuration may be cell-specific such that a guard band of a same width is initially configured for each group of two or more UEs associated with a same set of FD resources. As discussed below, an initial configuration may subsequently be updated via UE dedicated signaling based on performance metrics (e.g., self-interference measures).

In some aspects, the base station 604 may configure 608 the set of FD resources based on a current (or expanded) time division duplex (TDD) BWP definition. For example, an uplink BWP may be fully overlapped or partially overlapped with a downlink BWP (e.g., as described above in relation to FIGS. 5A and 5B) and such as illustrated for the DL BWP 1 and the UL BWP 1 in FIG. 19. As an example, if the BWPs span 5 tones, the base station 604 may configure the restricted uplink portion to include the lower 2 tones of the 5 tones and the restricted downlink portion to use upper 2 tones of the 5 tones. The guard resources between the restricted uplink portion and the restricted downlink portion may correspond to a middle tone of the 5 tones to serve as guard band for a frequency division multiplexed (FDMed) full-duplex mode of the base station.

The base station 604 may transmit, and UE 602 may receive, FD configuration 610A (for the downlink BWP and the restricted downlink portion) indicating the frequency resources associated with DL transmissions to the UE 602. The base station 604 may also transmit, and UE 606 may receive, FD configuration 610B information for the base station (for the uplink BWP and the restricted uplink portion) indicating the frequency resources associated with UL transmissions from the UE 606. The FD configuration may indicate to the UE the restricted portion for a previously configured DL or UL BWP, e.g., as described in connection with FIG. 19. In some aspects, the FD configurations 610A and 610B may be transmitted via RRC signaling or via dynamic signaling (e.g., DCI). The FD configurations 610A and 610B may be indicated based on an indication of a particular FD configuration in a known (e.g., preconfigured) set of FD configurations via RRC signaling or via a dynamic signaling. In some aspects, the FD configurations 610A and 610B may be transmitted via a same set of time resources, an overlapping set of time resources, or disjoint time resources.

Based on the FD configuration 610A, the base station may transmit, and the UE 602 may receive, DL transmission 612A via the resources in the restricted downlink portion. At a same, or overlapping, set of time resources, the UE 606 may transmit, and the base station 604 may receive, UL transmission 612B via the resources in restricted uplink portion. Each of UE 602 and UE 606, in some aspects operates in a half-duplex mode.

Based on the DL transmission 612A, the UE 602, the base station 604, and the UE 606 may measure 614 a self-interference (SI) at the UE 602, the base station 604, and the UE 606, respectively. The UE 602 and the UE 606 may report, and the base station 604 may receive, SI report 616A and 616B, respectively. For example, the base station may measure SI from the DL transmission 612A via the frequency resources in the restricted downlink portion to the reception of UL transmission 612B via restricted uplink portion. Similarly, the UE 602 and/or 606 may measure a SI. The measured and/or reported self-interference may depend on the width of the configured guard band and/or on the different directional (or directed) beams used to communicate with each of UE 602 and UE 606.

The base station 604 may, based on the measured and/or reported SI, adjust 618 the configuration of the FD resources. For example, for a measured 614 SI that is above a first threshold (e.g., the DL transmission 612A interferes with the reception of the UL transmission 612B more than a threshold amount), the base station 604 may adjust 618 the configuration of the FD resources to increase a separation (e.g., increase a width of a guard band) of the restricted downlink portion and the restricted uplink portion. In some aspects, for a measured 614 SI that is below a first threshold (e.g., the DL transmission 612A interferes with the reception of the UL transmission 612B less than a threshold amount), the base station 604 may adjust 618 the configuration of the FD resources to decrease a separation of the restricted downlink portion and the restricted uplink portion (e.g., make a guard band smaller or allow the restricted downlink portion and the restricted uplink portion to overlap or overlap more). For example, the size of the restricted portions in FIG. 19 may change based on the SI experienced by the base station and/or by the UE. Similarly, for a reported SI 616A/616B that is above a first threshold (e.g., a transmission from the UE interferes with a reception at the UE more than a threshold amount), the base station 604 may adjust 618 the configuration of the FD resources to increase a separation (e.g., increase a width of a guard band) of the restricted downlink portion and the restricted uplink portion. In some aspects, for a reported SI 616A/616B that is below a first threshold (e.g., a transmission from the UE interferes with a reception at the UE less than a threshold amount), the base station 604 may adjust 618 the configuration of the FD resources to decrease a separation of the restricted downlink portion and the restricted uplink portion (e.g., make a guard band smaller or allow the restricted downlink portion and the restricted uplink portion to overlap or overlap more). In some aspects, the adjusted configuration of the FD resources may include an adjusted downlink BWP, an adjusted uplink BWP, an adjusted restricted downlink portion, and/or an adjusted restricted uplink portion.

Based on the updated 618 configuration of the FD resources, the base station 604 may transmit, and UE 602 may receive, FD configuration 620A indicating the updated frequency resources (e.g., an updated restricted downlink portion) associated with subsequent DL transmissions to the UE 602. The base station 604 may also transmit, and UE 606 may receive, FD configuration 620B indicating the updated frequency resources (e.g., an updated restricted uplink portion) associated with UL transmissions from the UE 606. In some aspects, the FD configurations 620A and 620B may be transmitted via a same set of time resources, an overlapping set of time resources, or disjoint time resources.

Based on the FD configuration 620A, the base station 604 may transmit, and the UE 602 may receive, DL transmission 622A via the resources in the updated restricted downlink portion. At a same, or overlapping, set of time resources, the UE 606 may transmit, and the base station 604 may receive, UL transmission 622B via the resources in the updated restricted uplink portion. Each of UE 602 and UE 606, in some aspects operates in a half-duplex mode.

Figure 7:
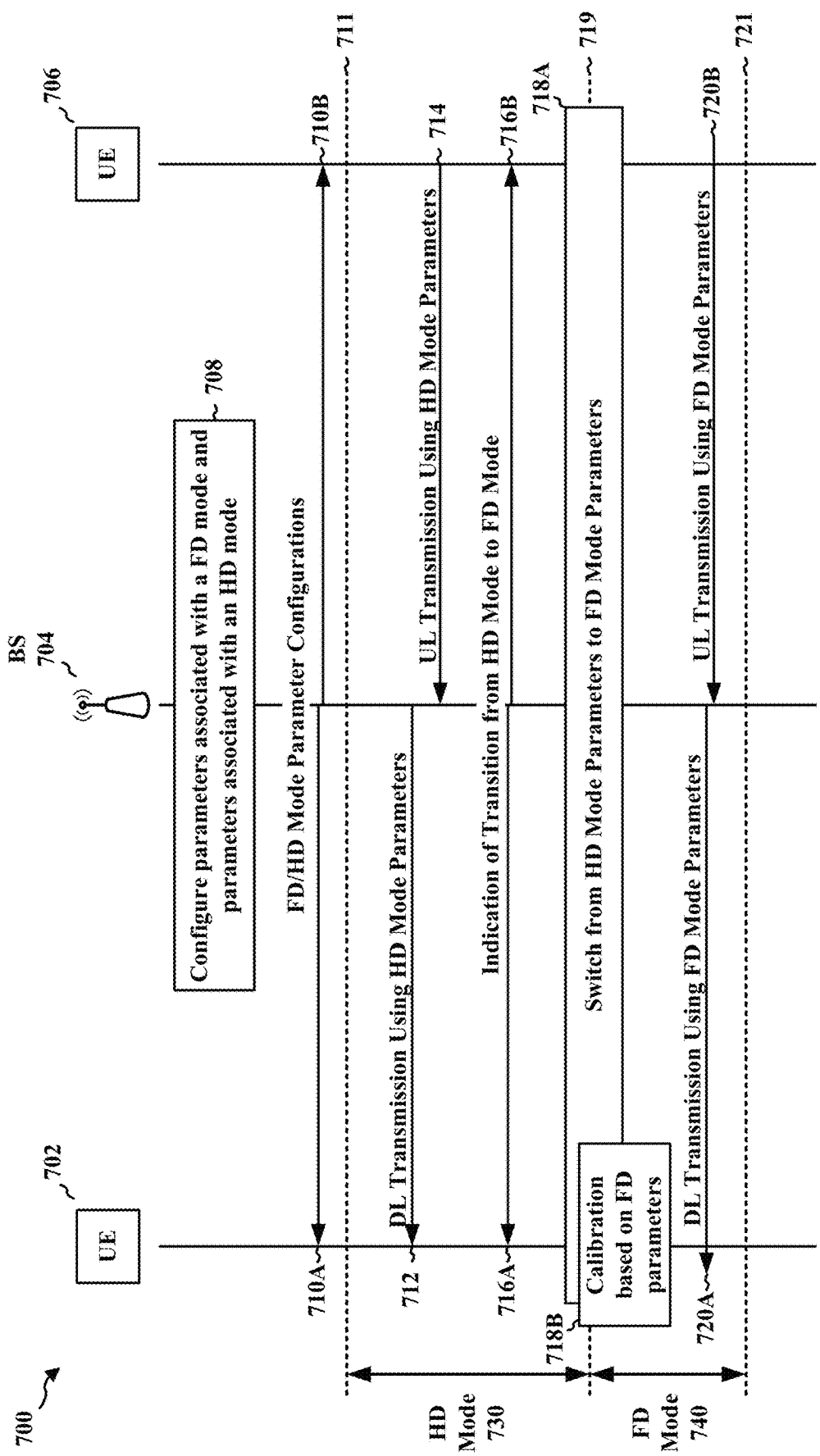
FIG. 7 is a call flow diagram illustrating a method of wireless communication in accordance with various aspects of the present disclosure.

In some aspects, a base station may operate in a full-duplex mode of operation during a first set of time periods and a half-duplex mode operation during a second set of time periods. The full-duplex mode of operation may be associated with a first set of parameters (e.g., a transmission power, a beam, a precoder, rank indicator (RI), modulation and coding scheme (MCS), and/or a timing advance (TA)) while the half-duplex mode may be associated with a second set of parameters. FIG. 7 is a call flow diagram 700 illustrating a method of wireless communication in accordance with various aspects of the present disclosure. A base station 704 that may operate in one of a full-duplex mode or a half-duplex mode during a particular time period may configure 708 transmission/reception parameters associated with the full-duplex mode and the half-duplex mode.

The base station 704 may transmit, and UE 702 and UE 706 may receive, an indication of the full-duplex mode and half-duplex mode parameter configurations 710A and 710B, respectively. The full-duplex mode parameter configuration may include a first set of parameters, including at least one of a first transmission power, a first transmission beam, a first precoder, a first RI, a first MCS, or a first TA, while the half-duplex mode parameter configuration may include a second set of parameters, including at least one of a second transmission power, a second transmission beam, a second precoder, a second RI, a second MCS, or a second TA. In some aspects, the indication of the full-duplex mode and half-duplex mode parameter configurations 710A and 710B may be transmitted via RRC signaling for subsequent activation via dynamic signaling (e.g., DCI).

The full-duplex mode and half-duplex mode parameter configurations 710A and 710B may further include an indication of a first set of resources for a full-duplex mode of operation of the base station and a second set of resources for the half-duplex mode of operation of the base station. The first set of resources and/or the second set of resources may include one or more scheduled (e.g., periodic or aperiodic) sets of time-domain resources (e.g., frames, slots, symbols, etc.) associated with the full-duplex mode and/or the half-duplex mode. For example, the full-duplex mode and half-duplex mode parameter configurations 710A and 710B may indicate one or more of a start time 711 for the half-duplex mode of operation 730, a time 719 that is an end time for the half-duplex mode of operation 730 and a start time for the full-duplex mode of operation 740, an end time 721 for the full-duplex mode of operation 740, and/or a duration of the half-duplex mode of operation 730 and/or the full-duplex mode of operation 740.

Based on the full-duplex mode and half-duplex mode parameter configurations 710A, the base station 704 may transmit, and the UE 702 may receive, a DL transmission 712 using the half-duplex mode parameters indicated by the received full-duplex mode and half-duplex mode parameter configurations 710A. The UE 706 may transmit, and the base station 704 may receive, an UL transmission 714 using the half-duplex mode parameters indicated by the received full-duplex mode and half-duplex mode parameter configurations 710B. The DL transmission 712 and the UL transmission 714, in some aspects, are transmitted via different time-domain resources (e.g., in a half-duplex mode).

In some aspects, the base station 704 may transmit, and the UE 702 and the UE 706 may receive, an indication of a transition from the half-duplex mode to the full-duplex mode 716A and 716B, respectively. In some aspects, the indications of the transition from the half-duplex mode to the full-duplex mode 716A and 716B may be omitted and the transition may be indicated by one or more of a known scheduling of transitions or a scheduling of transitions in the full-duplex mode and half-duplex mode parameter configurations 710A and 710B. The indications of the transition from the half-duplex mode to the full-duplex mode 716A and 716B, in some aspects, is transmitted a certain number of symbols, slots, frames, milliseconds, or seconds before the transition time 719.

Based on the indication of the transition from the half-duplex mode to the full-duplex mode 716A and 716B (or the known or configured scheduling of transitions), each of the UE 702, the base station 704, and the UE 706 may switch 718A from using the second set of parameters associated with the half-duplex mode of operation 730 to using the first set of parameters associated with the full-duplex mode of operation 740. The UE 702 may perform a calibration (e.g., an automatic gain control) operation 718B based on the first set of FD mode parameters after the beginning of the FD mode of operation (e.g., at or after time 719) to prepare to receive a DL transmission (e.g., 720A) from the base station 704 based on the first set of FD mode parameters. During the full-duplex mode of operation 740, the base station 704 may transmit, and the UE 702 may receive, a DL transmission 720A using the first set of parameters associated with the full-duplex mode. The UE 706 may transmit, and the base station 704 may receive, an UL transmission 720B using the first set of parameters associated with the full-duplex mode via a same, or an overlapping, set of time-domain resources.

The first set of parameters associated with the full-duplex mode of operation may also be associated with the FD resources configured 608 to include at least a restricted downlink portion and a restricted uplink portion such that during the full-duplex mode of operation 740 the UE 706 transmits a UL transmission via a restricted uplink portion and the UE 702 receives a DL transmission via a restricted downlink portion. For example, the DL transmission 720A using the first set of parameters associated with the full-duplex mode may be transmitted via a restricted downlink portion associated with DL transmissions and the UL transmission 720B using the first set of parameters associated with the full-duplex mode may be transmitted via a restricted uplink portion associated with UL transmissions. In some aspects, DL transmissions and UL transmissions in addition to DL transmission 712 and UL transmission 714 may be transmitted using the second set of parameters during half-duplex mode operation 730. DL transmissions and UL transmissions in addition to DL transmission 720A and UL transmission 720B, in some aspects, may be transmitted using the first set of parameters during full-duplex mode of operation 740.

FIGS. 8A and 8B illustrate slot and/or symbol structures associated with a full-duplex mode of operation. FIG. 8A illustrates a slot 816 beginning at a time 814 and including a set of 14 symbols that may include full-duplex mode data transmissions (e.g., full-duplex mode DL transmissions or full-duplex mode UL transmissions). As illustrated in FIG. 8A, slot 816 may be preceded by a symbol 820 (or a partial symbol) beginning at a time 812 and that may be used for a calibration operation (e.g., an automatic gain control (AGC) and/or tracking loop and recalibration). The additional symbol 820, or partial symbol, may be provided (either known to the UE or indicated via the indication of the transition from the half-duplex mode to the full-duplex mode 716A and 716B) in order that a coding rate need not be modified based on consuming time resources for calibration.

FIG. 8B illustrates a slot 856 that includes a first symbol beginning at a time 854 that may include calibration and/or non-data transmission in a symbol 860. The symbol 860 may include the calibration and/or non-data transmission in a first partial symbol 862 and a DL transmission (e.g., data) in a second partial symbol 864. In some aspects, the UE adjusts its AGC by its own implementation (e.g., using the partial symbol 862). The calibration operation via the first symbol 860 or the first partial symbol 862, in some aspects, may be known (e.g., preconfigured), may be autonomously determined by the UE, or may be indicated by the base station via one of RRC signaling and/or dynamic signaling.

Figure 9:
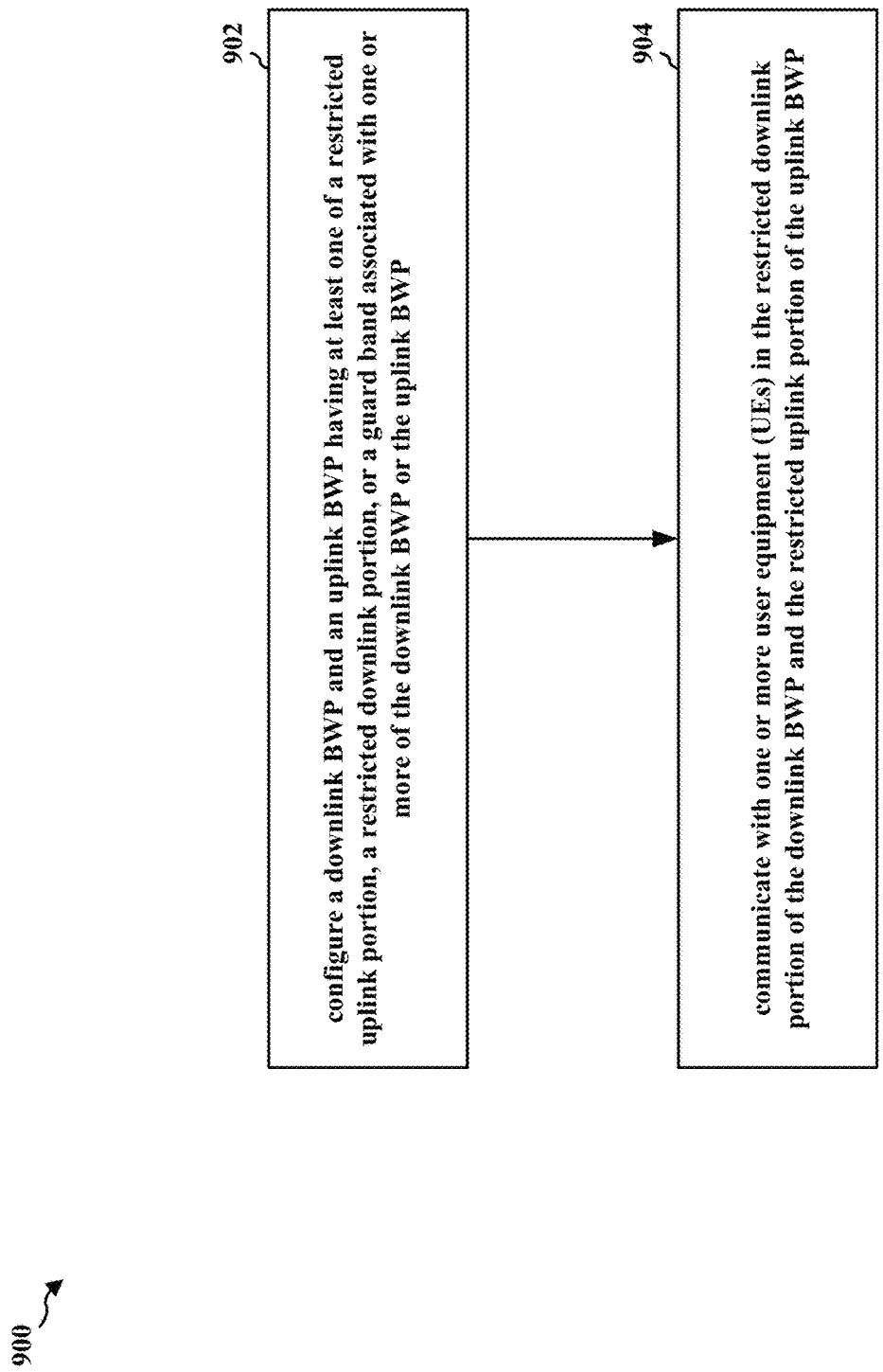
FIG. 9 is a flowchart of a method of wireless communication in accordance with various aspects of the present disclosure.

FIG. 9 is a flowchart 900 of a method of wireless communication. The method may be performed by a base station (e.g., the base station 102/180, 604, or 704; the apparatus 1802). At 902, the base station may configure a downlink BWP and an uplink BWP having at least one of a restricted uplink portion, a restricted downlink portion, or a guard band associated with one or more of the downlink BWP or the uplink BWP. For example, 902 may be performed by FD/HD mode configuration component 1840. In some aspects, the downlink BWP and the uplink BWP may be a same BWP, overlapping BWPs, or disjoint BWPs. For example, the uplink BWP may be at least one of included in the downlink BWP, partially overlapping with the downlink BWP, or separated from the downlink BWP by a guard band. The at least one of the restricted uplink portion, the restricted downlink portion, or the guard band, in some aspects, may be based on a rule associated with one or more of the downlink BWP or the uplink BWP. The rule may be cell specific and may include a default configuration of the downlink BWP and an uplink BWP having at least one of the restricted uplink portion, the restricted downlink portion, or the guard band associated with one or more of the downlink BWP or the uplink BWP. For a restricted downlink portion and a restricted uplink portion in a same BWP (e.g., where the downlink BWP and the uplink BWP are a same BWP), the restricted downlink portion and the restricted uplink portion may be one of overlapping or disjoint (e.g., be separated by a guard band or be adjacent).

An initial configuration of the restricted downlink portion and the restricted uplink portion may be separated by a default (or preconfigured) guard band of a positive, negative, or zero width associated with disjoint, overlapping, or adjacent restricted portions, respectively. The restricted downlink portion may be configured, at 902, to include a first subset of subcarriers in the BWP and the uplink BWP may be configured, at 902, to include a second non-overlapping subset of subcarriers in the BWP. The base station, at 902, may further configure the guard band to include a third subset of subcarriers between the first subset of subcarriers and the second subset of non-overlapping subcarriers. In some aspects, the downlink BWP and the uplink BWP may be configured, at 902, for a first cell including the first UE and the second UE. For example, referring to FIG. 6, the base station 604 may configure 608 a set of FD resources including at least a first restricted BWP (e.g., restricted downlink portion for DL transmissions) in a downlink BWP and a second restricted BWP (e.g., restricted uplink portion for UL transmissions) in an uplink BWP.

The base station may transmit, and a first and second UE may receive, an indication of the at least one of the restricted uplink portion associated with the uplink BWP, the restricted downlink portion associated with the downlink BWP, or the guard band that is between the restricted uplink portion and the restricted downlink portion. For example, the indication may be transmitted by FD/HD mode configuration transmission component 1842. In some aspects, the base station transmits a first indication for the first UE to use the restricted downlink portion of the downlink BWP for a DL communication with the base station and a second indication for the second UE to use the restricted uplink portion of the uplink BWP for a UL communication with the base station. The first and second indication for the first/second UE to use the restricted downlink/uplink portion of the downlink/uplink BWP for a DL/UL communication with the base station may be transmitted via RRC signaling or dynamic signaling. Transmitting the first/second indication may include transmitting an indication of a pre-configured configuration of the restricted downlink/uplink portion and/or the downlink/uplink BWP. For example, the first indication may be indicated based on an indication of a particular FD configuration (including the restricted downlink portion and/or the downlink BWP) in a known (e.g., preconfigured) set of FD configurations via RRC signaling or via a dynamic signaling.

Finally, at 904, the base station may communicate with one or more UEs in the restricted downlink portion of the downlink BWP and the restricted uplink portion of the uplink BWP. For example, 904 may be performed by FD communication component 1846. In some aspects, the communication may be based on the transmitted first indication and the transmitted second indication as described above. In some aspects, communicating with the one or more UEs includes transmitting a downlink transmission to a first UE in the restricted downlink portion of the downlink BWP and receiving an uplink transmission from a second UE in the restricted uplink portion of the uplink BWP. The base station may operate in a FDMed mode of operation using the downlink BWP and the uplink BWP such that a DL transmission to the first UE and the reception of an UL transmission from a second UE occur via a same or overlapping set of time resources. For example, referring to FIG. 6, the base station 604 may transmit, and the UE 602 may receive, DL transmission 612A and the base station may receive, and the UE 606 may transmit, UL transmission 612B.

Figure 10:
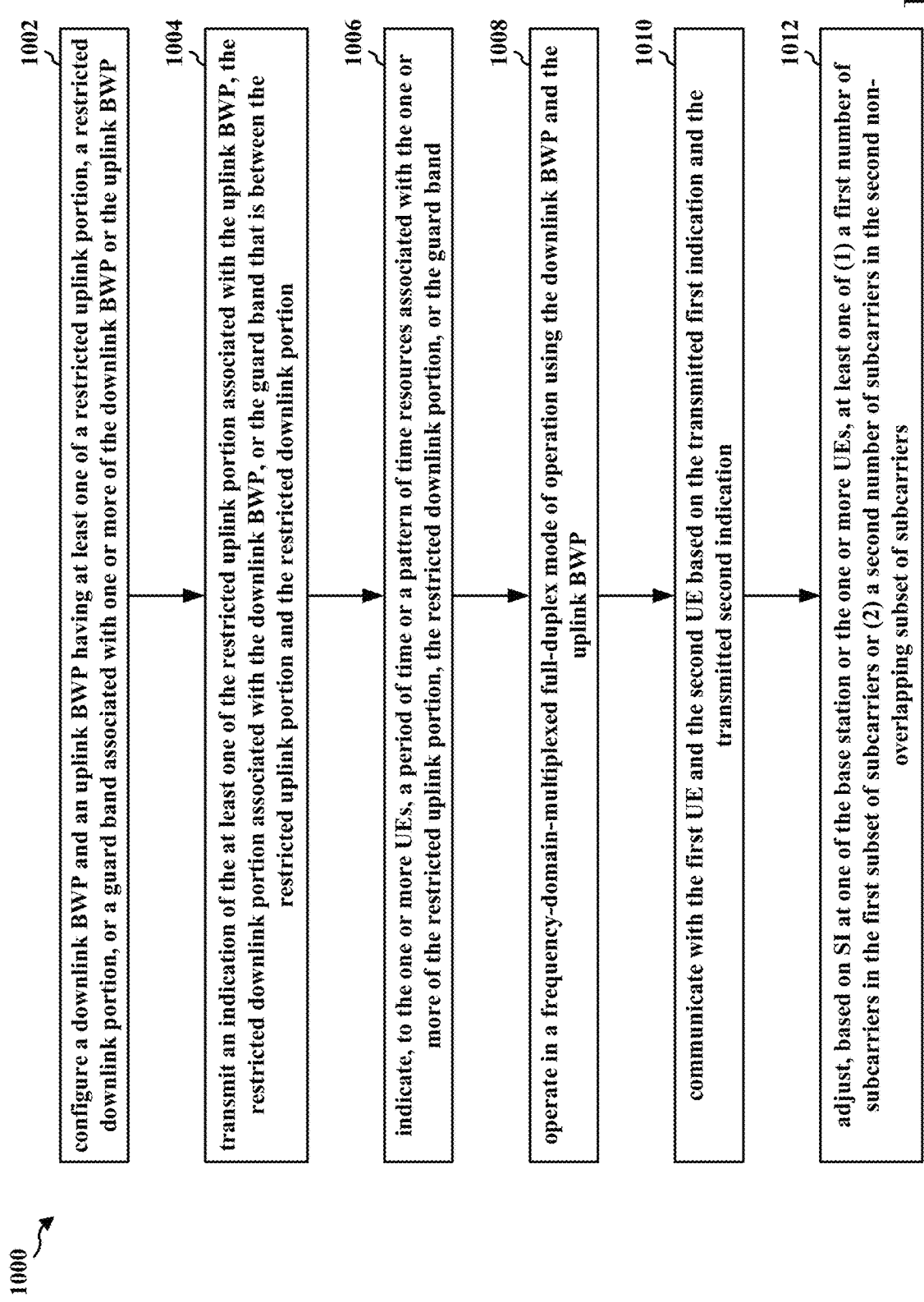
FIG. 10 is a flowchart of a method of wireless communication in accordance with various aspects of the present disclosure.

FIG. 10 is a flowchart 1000 of a method of wireless communication. The method may be performed by a base station (e.g., the base station 102/180, 604, or 704; the apparatus 1802). At 1002, the base station may configure a downlink BWP and an uplink BWP having at least one of a restricted uplink portion, a restricted downlink portion, or a guard band associated with one or more of the downlink BWP or the uplink BWP. For example, 1002 may be performed by FD/HD mode configuration component 1840. In some aspects, the downlink BWP and the uplink BWP may be a same BWP, overlapping BWPs, or disjoint BWPs. For example, the uplink BWP may be at least one of included in the downlink BWP, partially overlapping with the downlink BWP, or separated from the downlink BWP by a guard band. The at least one of the restricted uplink portion, the restricted downlink portion, or the guard band, in some aspects, may be based on a rule associated with one or more of the downlink BWP or the uplink BWP. The rule may be cell specific and may include a default configuration of the downlink BWP and an uplink BWP having at least one of the restricted uplink portion, the restricted downlink portion, or the guard band associated with one or more of the downlink BWP or the uplink BWP. For a restricted downlink portion and a restricted uplink portion in a same BWP (e.g., where the downlink BWP and the uplink BWP are a same BWP), the restricted downlink portion and the restricted uplink portion may be one of overlapping or disjoint (e.g., be separated by a guard band or be adjacent).

An initial configuration of the restricted downlink portion and the restricted uplink portion may be separated by a default (or preconfigured) guard band of a positive, negative, or zero width associated with disjoint, overlapping, or adjacent restricted portions, respectively. The restricted downlink portion may be configured, at 1002, to include a first subset of subcarriers in the BWP and the uplink BWP may be configured, at 1002, to include a second non-overlapping subset of subcarriers in the BWP. The base station, at 1002, may further configure the guard band to include a third subset of subcarriers between the first subset of subcarriers and the second subset of non-overlapping subcarriers. In some aspects, the downlink BWP and the uplink BWP may be configured, at 1002, for a first cell including the first UE and the second UE. For example, referring to FIG. 6, the base station 604 may configure 608 a set of FD resources including at least a first restricted BWP (e.g., restricted downlink portion for DL transmissions) in a downlink BWP (e.g., $BWP_1$) and a second restricted BWP (e.g., restricted uplink portion for UL transmissions) in an uplink BWP (e.g., $BWP_2$).

At 1004, the base station may transmit, and a first and second UE may receive, an indication of the at least one of the restricted uplink portion associated with the uplink BWP, the restricted downlink portion associated with the downlink BWP, or the guard band that is between the restricted uplink portion and the restricted downlink portion. For example, the indication may be transmitted by FD/HD mode configuration transmission component 1842. In some aspects, the base station transmits a first indication for the first UE to use the restricted downlink portion of the downlink BWP for a DL communication with the base station and a second indication for the second UE to use the restricted uplink portion of the uplink BWP for a UL communication with the base station. The first and second indication for the first/second UE to use the restricted downlink/uplink portion of the downlink/uplink BWP for a DL/UL communication with the base station may be transmitted via RRC signaling or dynamic signaling. For example, the first indication may be indicated based on an indication of a particular FD configuration (including the restricted downlink portion and/or the downlink BWP) in a known (e.g., preconfigured) set of FD configurations via RRC signaling or via a dynamic signaling. For example, referring to FIG. 6, the base station 604 may transmit, and the UEs 602 and 606 may receive, the FD configuration 610A and 610B.

At 1006, the base station may indicate, to the one or more UEs, a period of time or a pattern of time resources associated with the one or more of the restricted uplink portion, the restricted downlink portion, or the guard band. For example, 1006 may be performed by FD/HD mode configuration transmission component 1842. The indication of the period of time or the pattern of time resources may be transmitted via RRC signaling or via a dynamic signaling. For example, referring to FIG. 6, the base station 604 may transmit, and the UEs 602 and 606 may receive, the FD configuration 610A and 610B including an indication of a period of time or a pattern of time resources associated with the one or more of the restricted uplink portion, the restricted downlink portion, or the guard band.

At 1008, the base station may operate in a FDMed full-duplex mode of operation using the downlink BWP and the uplink BWP. For example, 1008 may be performed by FD communication component 1846. The base station operating in the FDMed mode of operation may include transmitting a DL transmission to the first UE and the reception of an UL transmission from a second UE occur via a same or overlapping set of time resources (e.g., indicated at 1006). For example, referring to FIG. 6, the base station 604 may operate in a full-duplex mode and may transmit, to the UE 602, a DL transmission and may receive, from the UE 606, an UL transmission via a same, or overlapping, time resources in the full-duplex mode.

At 1010, the base station may communicate with one or more UEs in the restricted downlink portion of the downlink BWP and the restricted uplink portion of the uplink BWP. For example, 1010 may be performed by FD communication component 1846. In some aspects, the communication may be based on the transmitted first indication and the transmitted second indication as described above. In some aspects, communicating with the one or more UEs includes transmitting a downlink transmission to a first UE in the restricted downlink portion of the downlink BWP and receiving an uplink transmission from a second UE in the restricted uplink portion of the uplink BWP. For example, referring to FIG. 6, the base station 604 may transmit, and the UE 602 may receive, DL transmission 612A and the base station may receive, and the UE 606 may transmit, UL transmission 612B.

Finally, in some aspects, at 1012, the base station may adjust, based on a self-interference of at least one of the base station or the one or more UEs, at least one of (1) a first number of subcarriers in the first subset of subcarriers in the restricted downlink portion of the downlink BWP or (2) a second number of subcarriers in the second non-overlapping subset of subcarriers comprising the restricted uplink portion of the uplink BWP. For example, 1012 may be performed by FD communication monitoring component 1844 and/or FD/HD mode configuration component 1840. Adjusting the at least one of the first number of subcarriers or the second number of subcarriers, in some aspects, may include one of increasing at least one of the first number of subcarriers in the first subset of subcarriers or the second number of subcarriers in the second non-overlapping subset of subcarriers based on the measured self-interference being below a first threshold or decreasing at least one of the first number of subcarriers in the first subset of subcarriers or the second number of subcarriers in the second non-overlapping subset of subcarriers based on the measured self-interference being above a second threshold. In some aspects, the base station may adjust (e.g., increase or decrease) a width of a guard band (e.g., including to/from a negative width indicating overlapping UL and downlink BWPs or overlapping restricted downlink and uplink portions). For example, referring to FIG. 6, the base station 604 may adjust 618 a configuration of the FD resources (e.g., the first number of subcarriers or the second number of subcarriers).

Figure 11:
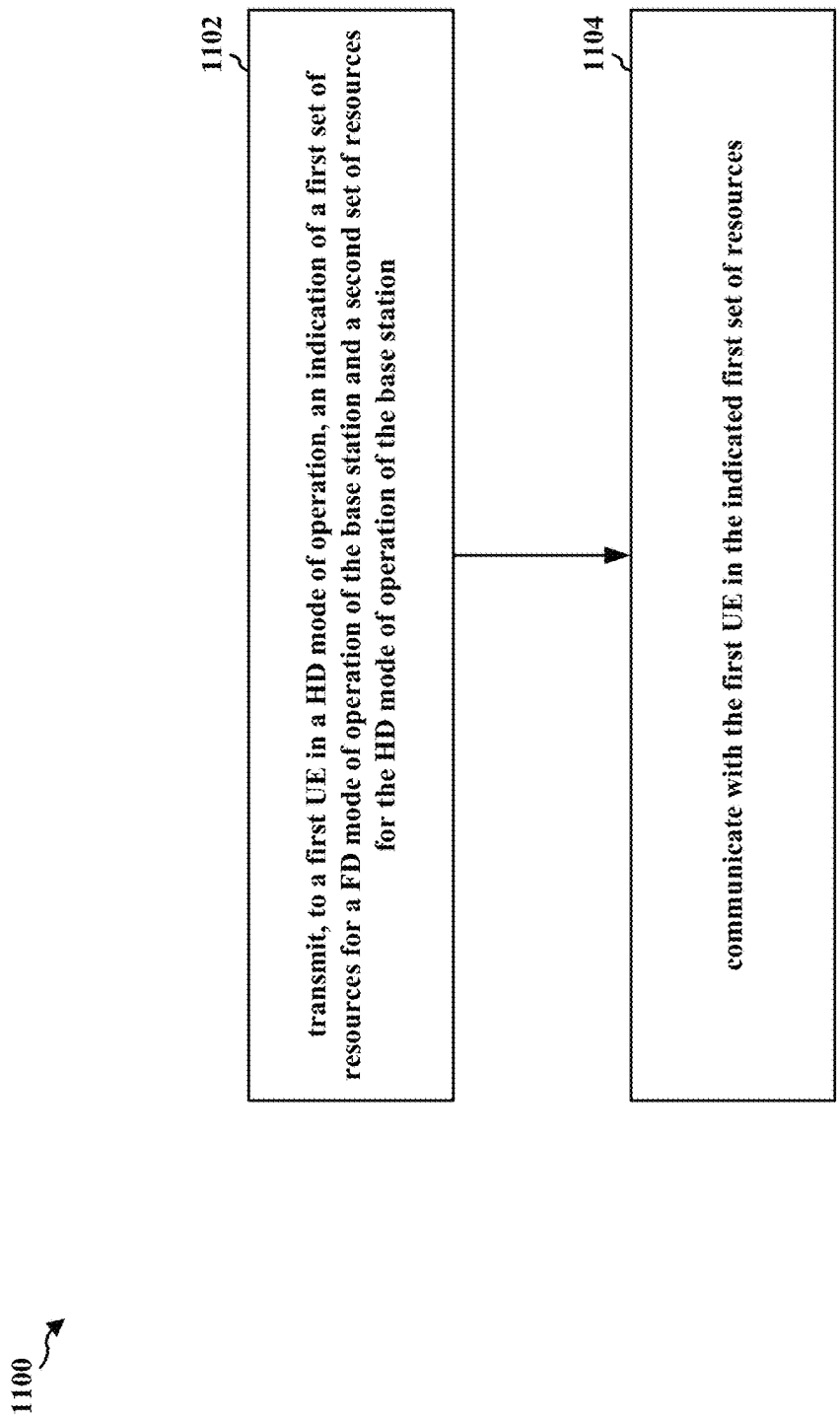
FIG. 11 is a flowchart of a method of wireless communication in accordance with various aspects of the present disclosure.

FIG. 11 is a flowchart 1100 of a method of wireless communication. The method may be performed by a base station (e.g., the base station 102/180, 604, or 704; the apparatus 1802). At 1102, the base station may transmit, to a first UE in a half-duplex mode of operation, an indication of a first set of resources for a full-duplex mode of operation of the base station and a second set of resources for the half-duplex mode of operation of the base station. In some aspects, the base station may transmit to a second UE in a half-duplex mode of operation, an indication of a third set of resources for the full-duplex mode of operation. For example, 1102 may be performed by FD/HD mode configuration transmission component 1842. The first set of resources and the second set of resources may be associated with a configured first set of parameters for the full-duplex mode of the base station and a configured second set of parameters for the half-duplex mode of the base station, respectively. The first set of parameters and the second set of parameters, in some aspects, include at least one of a transmission power, a transmission beam, a precoder, a rank indicator, a modulation and coding scheme, or a timing advance. In some aspects, at least one of value in the first set of parameters may be different from a corresponding parameter value in the second set of parameters. The first set of resources may include a set of time resources associated with a data transmission to the first UE and a data reception from a second UE communication. For example, referring to FIG. 7, the base station 704 may transmit an FD/HD mode parameter configuration 710A and 710B.

At 1104, the base station may communicate with the first UE in the indicated first set of resources. For example, 1104 may be performed by FD communication component 1846. The base station may transmit a DL data transmission to the first UE in the set of time resources via the first set of resources. In some aspects, the base station may further communicate with the second UE in the set of time resources via the third set of resources. For example, referring to FIG. 7, the base station 704 may transmit, and UE 702 may receive, DL transmission 720A (e.g., via the first set of resources) and may receive, from UE 706, UL transmission 720B (e.g., via the third set of resources) during a same, or overlapping, set of time resources (e.g., a set of time resources included in the first set of resources and the third set of resources).

Figure 12:
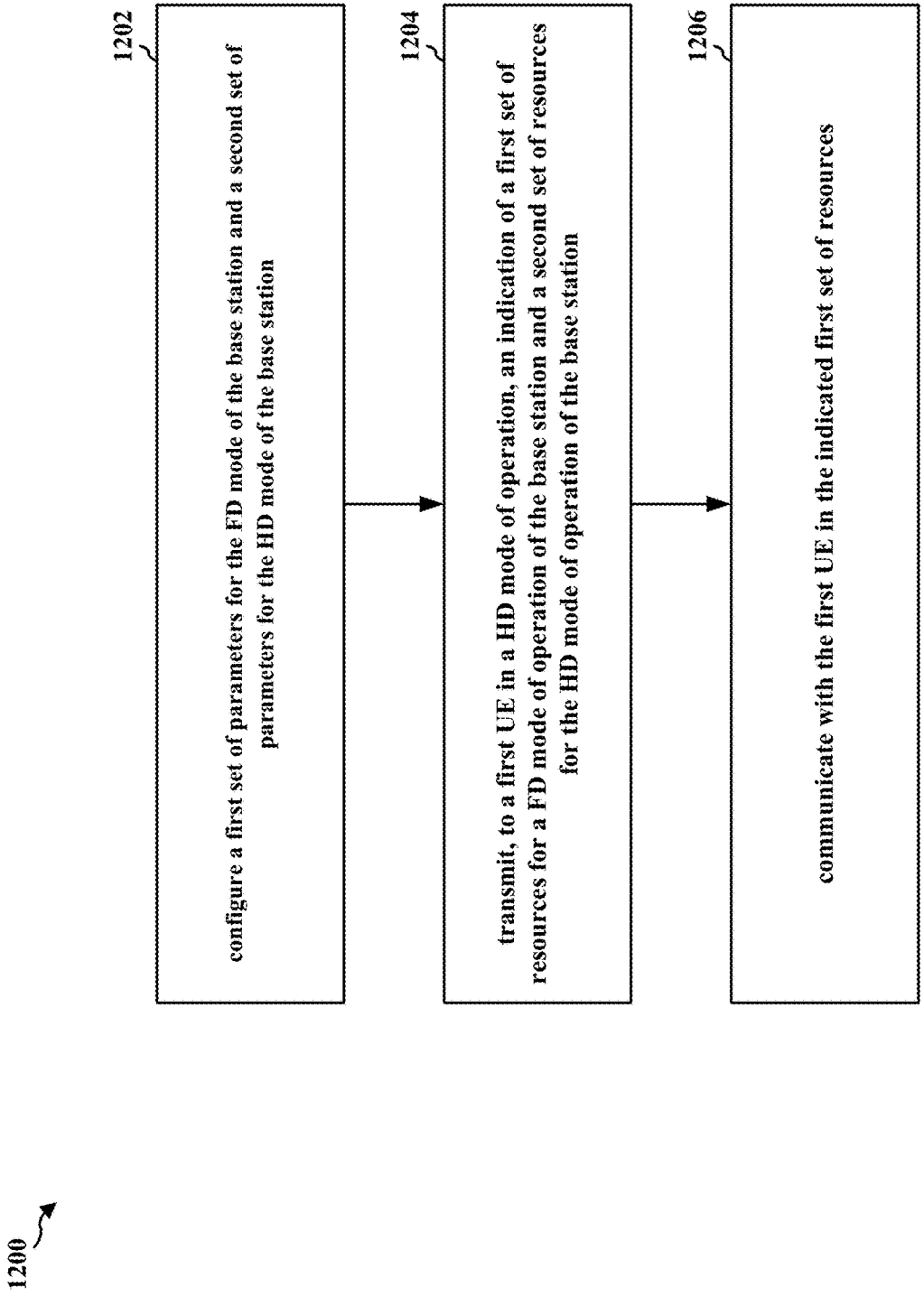
FIG. 12 is a flowchart of a method of wireless communication in accordance with various aspects of the present disclosure.

FIG. 12 is a flowchart 1200 of a method of wireless communication. The method may be performed by a base station (e.g., the base station 102/180, 604, or 704; the apparatus 1802). At 1202, the base station may configure a first set of parameters for a full-duplex mode of the base station and a second set of parameters for a half-duplex mode of the base station. For example, 1202 may be performed by FD/HD mode configuration component 1840. In some aspects, the first set of parameters includes at least one of a transmission power, a transmission beam, a precoder, a rank indicator, a modulation and coding scheme, or a timing advance. At least one value in the first set of parameters, in some aspects, may be different from a corresponding parameter value in the second set of parameters. In some aspects, the base station may also configure a first set of resources associated with the first set of parameters for the full-duplex mode of operation of the base station and a second set of resources associated with the second set of parameters for the half-duplex mode of operation of the base station. The first set of resources, in some aspects, may be associated with a first UE operating in a half-duplex mode and a third set of resources associated with the first set of parameters may be configured for a second UE operating in a half-duplex mode. The first set of resources may include a set of time resources associated with a data transmission to the first UE and a data reception from a second UE communication. For example, referring to FIG. 7, the base station 704 may configure 708 transmission/reception parameters (e.g., the first and second sets of parameters) associated with the full-duplex mode and the half-duplex mode.

At 1204, the base station may transmit, to a first UE in a half-duplex mode of operation, an indication of a first set of resources for a full-duplex mode of operation of the base station and a second set of resources for the half-duplex mode of operation of the base station. In some aspects, the base station may transmit to a second UE in a half-duplex mode of operation, an indication of the third set of resources for the full-duplex mode of operation. For example, 1204 may be performed by FD/HD mode configuration transmission component 1842. The base station may also transmit, at 1204, the configured first set of parameters for the full-duplex mode of the base station and the configured second set of parameters for the half-duplex mode of the base station. For example, referring to FIG. 7, the base station 704 may transmit an FD/HD mode parameter configuration 710A and 710B.

At 1206, the base station may communicate with the first UE in the indicated first set of resources. For example, 1206 may be performed by FD communication component 1846. The base station may transmit a DL data transmission to the first UE in the set of time resources via the first set of resources. In some aspects, the base station may further communicate with the second UE in the set of time resources via the third set of resources. For example, referring to FIG. 7, the base station 704 may transmit, and UE 702 may receive, DL transmission 720A (e.g., via the first set of resources) and may receive, from UE 706, UL transmission 720B (e.g., via the third set of resources) during a same, or overlapping, set of time resources (e.g., a set of time resources included in the first set of resources and the third set of resources).

Figure 13:
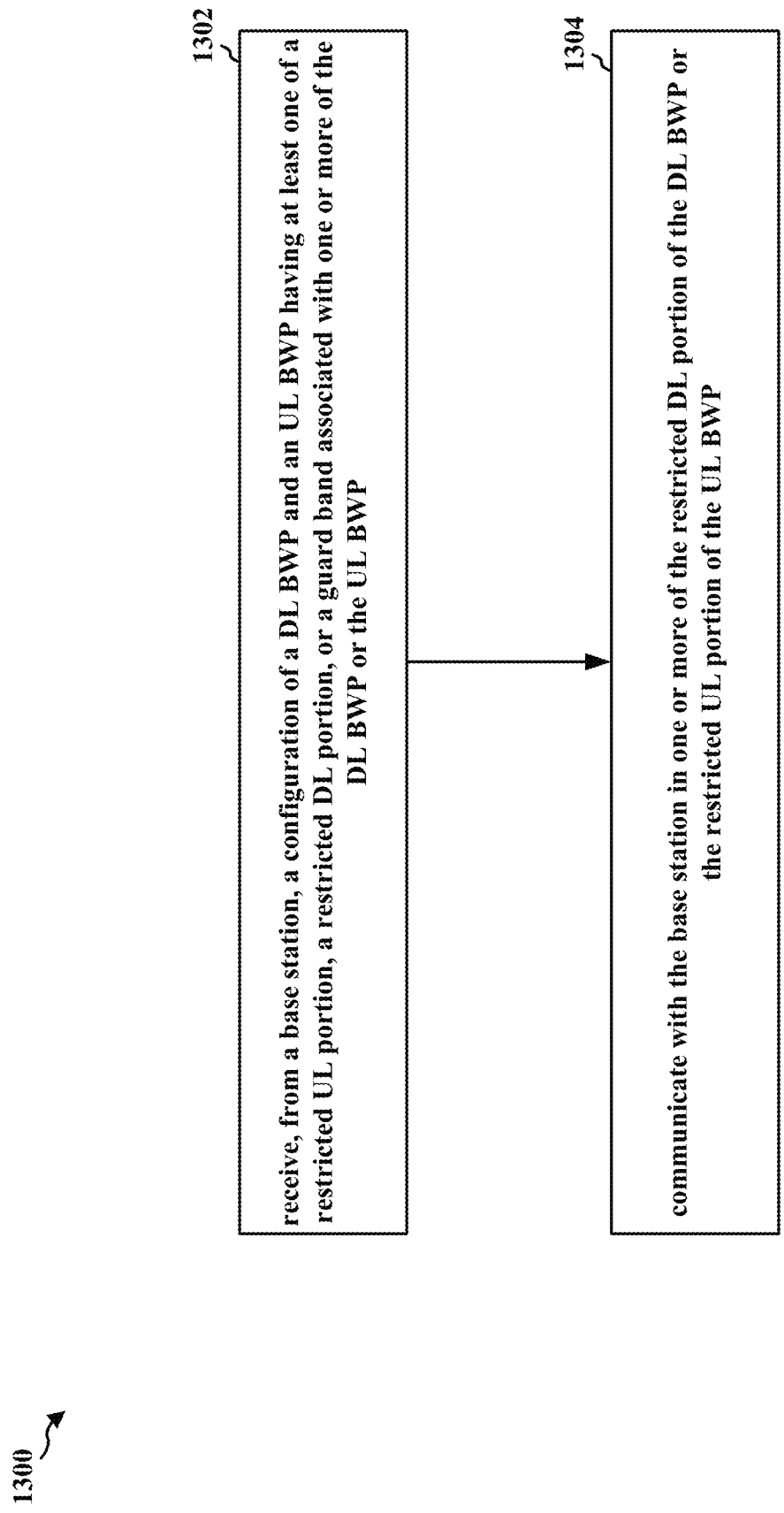
FIG. 13 is a flowchart of a method of wireless communication in accordance with various aspects of the present disclosure.

FIG. 13 is a flowchart 1300 of a method of wireless communication. The method may be performed by a UE (e.g., the UE 104, 602, 606, 702, or 706; the apparatus 1702). At 1302, the UE may receive, from a base station, a configuration of a downlink BWP and an uplink BWP having at least one of a restricted uplink portion, a restricted downlink portion, or a guard band associated with one or more of the downlink BWP or the uplink BWP. For example, 1302 may be performed by FD/HD mode configuration reception component 1740. In some aspects, the downlink BWP and the uplink BWP may be a same BWP, overlapping BWPs, or disjoint BWPs. For example, the uplink BWP may be at least one of included in the downlink BWP, partially overlapping with the downlink BWP, or separated from the downlink BWP by a guard band. The UE may also receive, at 1302, an indication of the at least one of the restricted uplink portion associated with the uplink BWP, the restricted downlink portion associated with the downlink BWP, or the guard band that is between the restricted uplink portion and the restricted downlink portion.

The at least one of the restricted uplink portion, the restricted downlink portion, or the guard band, in some aspects, may be based on a rule associated with one or more of the downlink BWP or the uplink BWP. The rule may be cell specific and may include a default configuration of the downlink BWP and an uplink BWP having at least one of the restricted uplink portion, the restricted downlink portion, or the guard band associated with one or more of the downlink BWP or the uplink BWP. For a restricted downlink portion and a restricted uplink portion in a same BWP (e.g., where the downlink BWP and the uplink BWP are a same BWP), the restricted downlink portion and the restricted uplink portion may be one of overlapping or disjoint (e.g., be separated by a guard band or be adjacent).

An initial configuration of the restricted downlink portion and the restricted uplink portion may be separated by a default (or preconfigured) guard band of a positive, negative, or zero width associated with disjoint, overlapping, or adjacent restricted portions, respectively. The UE may receive an indication of (1) a first subset of subcarriers in the downlink BWP associated with the restricted downlink portion and/or (2) a second non-overlapping subset of subcarriers in the uplink BWP associated with the restricted uplink portion. The restricted downlink portion and the restricted uplink portion may further define a guard band including a third subset of subcarriers between the first subset of subcarriers and the second subset of non-overlapping subcarriers. In some aspects, the downlink BWP and the uplink BWP may be configured for a first cell including the first UE and the second UE. For example, referring to FIG. 6, the UE 602 (or 606) may receive a FD configuration 610A (or 610B) including a configuration of a downlink BWP and an uplink BWP having at least one of a restricted uplink portion, a restricted downlink portion, or a guard band associated with one or more of the downlink BWP or the uplink BWP.

Finally, at 1304, the UE may communicate with the base station in one or more of the restricted downlink portion of the downlink BWP or the restricted uplink portion of the uplink BWP. For example, 1304 may be performed by FD communication component 1742. In some aspects, the communication may be based on the received configuration of the downlink BWP or the uplink BWP and the received indication. In some aspects, communicating with the base station includes one or more of receiving a DL transmission via the restricted downlink portion of the downlink BWP or transmitting an UL transmission via the restricted uplink portion of the uplink BWP. The UE may operate in a half-duplex mode and the base station may operate in a FDMed mode of operation using the downlink BWP and the uplink BWP such that a DL transmission and a reception of an UL transmission occur via a same or overlapping set of time resources. For example, referring to FIG. 6, the base station 604 may transmit, and the UE 602 may receive, DL transmission 612A and the base station may receive, and the UE 606 may transmit, UL transmission 612B.

Figure 14:
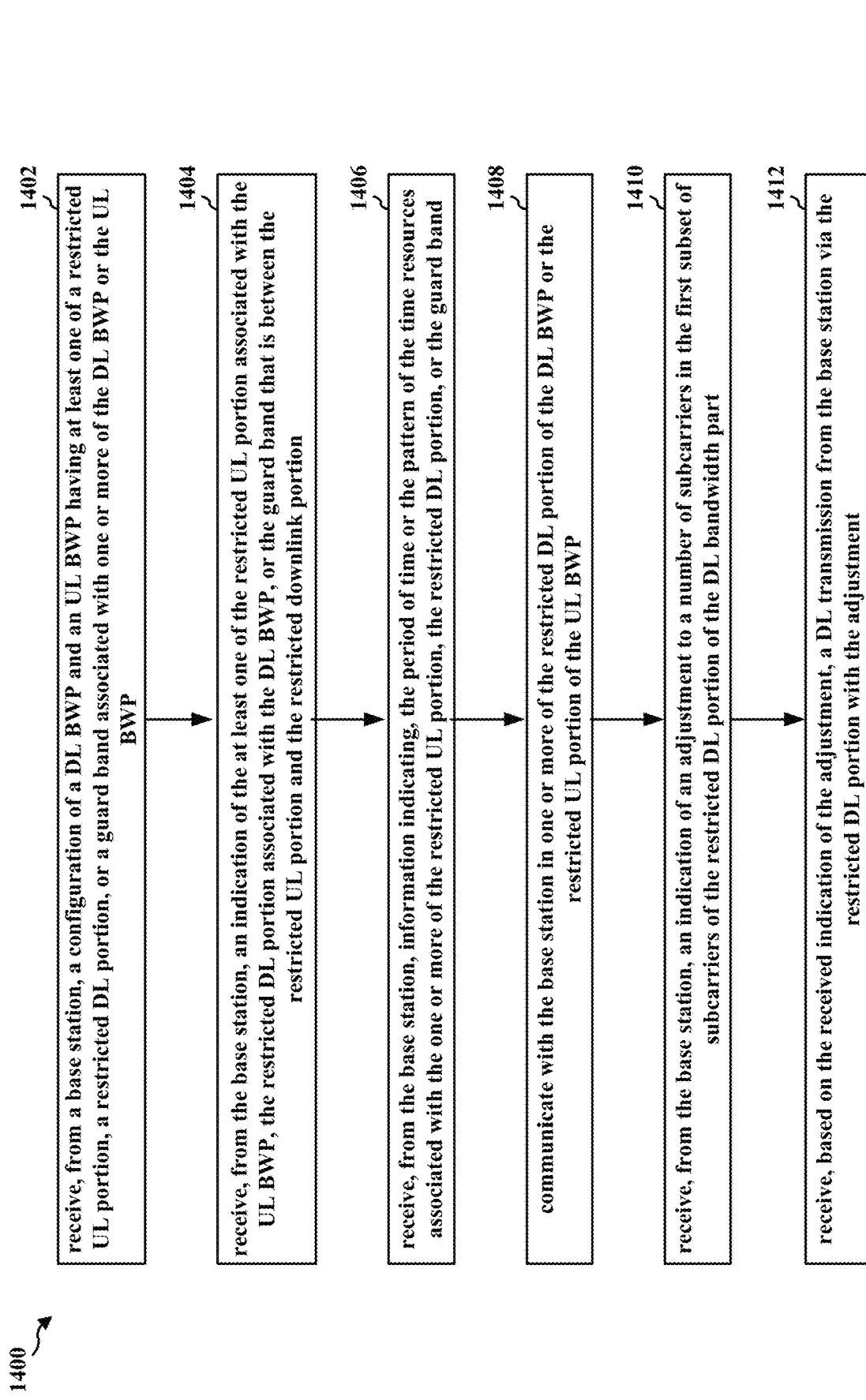
FIG. 14 is a flowchart of a method of wireless communication in accordance with various aspects of the present disclosure.

FIG. 14 is a flowchart 1400 of a method of wireless communication. The method may be performed by a UE (e.g., the UE 104, 602, 606, 702, or 706; the apparatus 1702). At 1402, the UE may receive, from a base station, a configuration of a downlink BWP and an uplink BWP having at least one of a restricted uplink portion, a restricted downlink portion, or a guard band associated with one or more of the downlink BWP or the uplink BWP. For example, 1402 may be performed by FD/HD mode configuration reception component 1740. In some aspects, the downlink BWP and the uplink BWP may be a same BWP, overlapping BWPs, or disjoint BWPs. For example, the uplink BWP may be at least one of included in the downlink BWP, partially overlapping with the downlink BWP, or separated from the downlink BWP by a guard band. For example, referring to FIG. 6, the UE 602 (or 606) may receive a FD configuration 610A (or 610B) including a configuration of a downlink BWP and an uplink BWP having at least one of a restricted uplink portion, a restricted downlink portion, or a guard band associated with one or more of the downlink BWP or the uplink BWP.

At 1404, the UE may receive, from the base station, an indication of the at least one of the restricted uplink portion associated with the uplink BWP, the restricted downlink portion associated with the downlink BWP, or the guard band that is between the restricted uplink portion and the restricted downlink portion. For example, 1404 may be performed by FD/HD mode configuration reception component 1740. The at least one of the restricted uplink portion, the restricted downlink portion, or the guard band, in some aspects, may be based on a rule associated with one or more of the downlink BWP or the uplink BWP. The rule may be cell specific and may include a default configuration of the downlink BWP and an uplink BWP having at least one of the restricted uplink portion, the restricted downlink portion, or the guard band associated with one or more of the downlink BWP or the uplink BWP. For a restricted downlink portion and a restricted uplink portion in a same BWP (e.g., where the downlink BWP and the uplink BWP are a same BWP), the restricted downlink portion and the restricted uplink portion may be one of overlapping or disjoint (e.g., be separated by a guard band or be adjacent).

An initial configuration of the restricted downlink portion and the restricted uplink portion may be separated by a default (or preconfigured) guard band of a positive, negative, or zero width associated with disjoint, overlapping, or adjacent restricted portions, respectively. The UE may receive an indication of (1) a first subset of subcarriers in the downlink BWP associated with the restricted downlink portion and/or (2) a second non-overlapping subset of subcarriers in the uplink BWP associated with the restricted uplink portion. The restricted downlink portion and the restricted uplink portion may further define a guard band including a third subset of subcarriers between the first subset of subcarriers and the second subset of non-overlapping subcarriers. In some aspects, the downlink BWP and the uplink BWP may be configured for a first cell including the first UE and the second UE. For example, referring to FIG. 6, the UE 602 (or 606) may receive a FD configuration 610A (or 610B) including an indication of the at least one of the restricted uplink portion associated with the uplink BWP, the restricted downlink portion associated with the downlink BWP, or the guard band that is between the restricted uplink portion and the restricted downlink portion.

In some aspects, the one or more of the restricted uplink portion, the restricted downlink portion, or the guard band are associated with a period of time or a pattern of time resources. At 1406, the UE may receive, from the base station, information indicating, the period of time or the pattern of the time resources associated with the one or more of the restricted uplink portion, the restricted downlink portion, or the guard band. For example, 1406 may be performed by FD/HD mode configuration reception component 1740. For example, referring to FIG. 6, the UE 602 (or 606) may receive a FD configuration 610A (or 610B) including the information indicating, the period of time or the pattern of the time resources associated with the one or more of the restricted uplink portion, the restricted downlink portion, or the guard band At 1408, the UE may communicate with the base station in one or more of the restricted downlink portion of the downlink BWP or the restricted uplink portion of the uplink BWP. For example, 1408 may be performed by FD communication component 1742. In some aspects, the communication may be based on the received configuration of the downlink BWP or the uplink BWP and the received indication.

In some aspects, communicating with the base station includes one or more of receiving a DL transmission via the restricted downlink portion of the downlink BWP or transmitting an UL transmission via the restricted uplink portion of the uplink BWP. The UE may operate in a half-duplex mode and the base station may operate in a FDMed mode of operation using the downlink BWP and the uplink BWP such that a DL transmission and a reception of an UL transmission occur via a same or overlapping set of time resources. For example, referring to FIG. 6, the base station 604 may transmit, and the UE 602 may receive, DL transmission 612A and the base station may receive, and the UE 606 may transmit, UL transmission 612B.

At 1410, the UE may receive, from the base station, an indication of an adjustment to a number of subcarriers in the first subset of subcarriers of the restricted downlink portion of the downlink bandwidth part. For example, 1410 may be performed by FD/HD mode configuration reception component 1740. The adjustment may include an increase to at least one of the first number of subcarriers in the first subset of subcarriers or the second number of subcarriers in the second non-overlapping subset of subcarriers based on the measured self-interference being below a first threshold. In some aspects, the adjustment may include a decrease at least one of the first number of subcarriers in the first subset of subcarriers or the second number of subcarriers in the second non-overlapping subset of subcarriers based on the measured self-interference being above a second threshold. For example, referring to FIG. 6, the UE 602 (or 606) may receive updated FD configuration 620A (or 620B) including an indication of an adjustment.

At 1412, the UE may receive, based on the received indication of the adjustment, a DL transmission from the base station via the restricted downlink portion with the adjustment. For example, 1412 may be performed by FD communication component 1742. For example, referring to FIG. 6, the UE 602 may receive, from the base station 604, DL transmission 622A.

Figure 15:
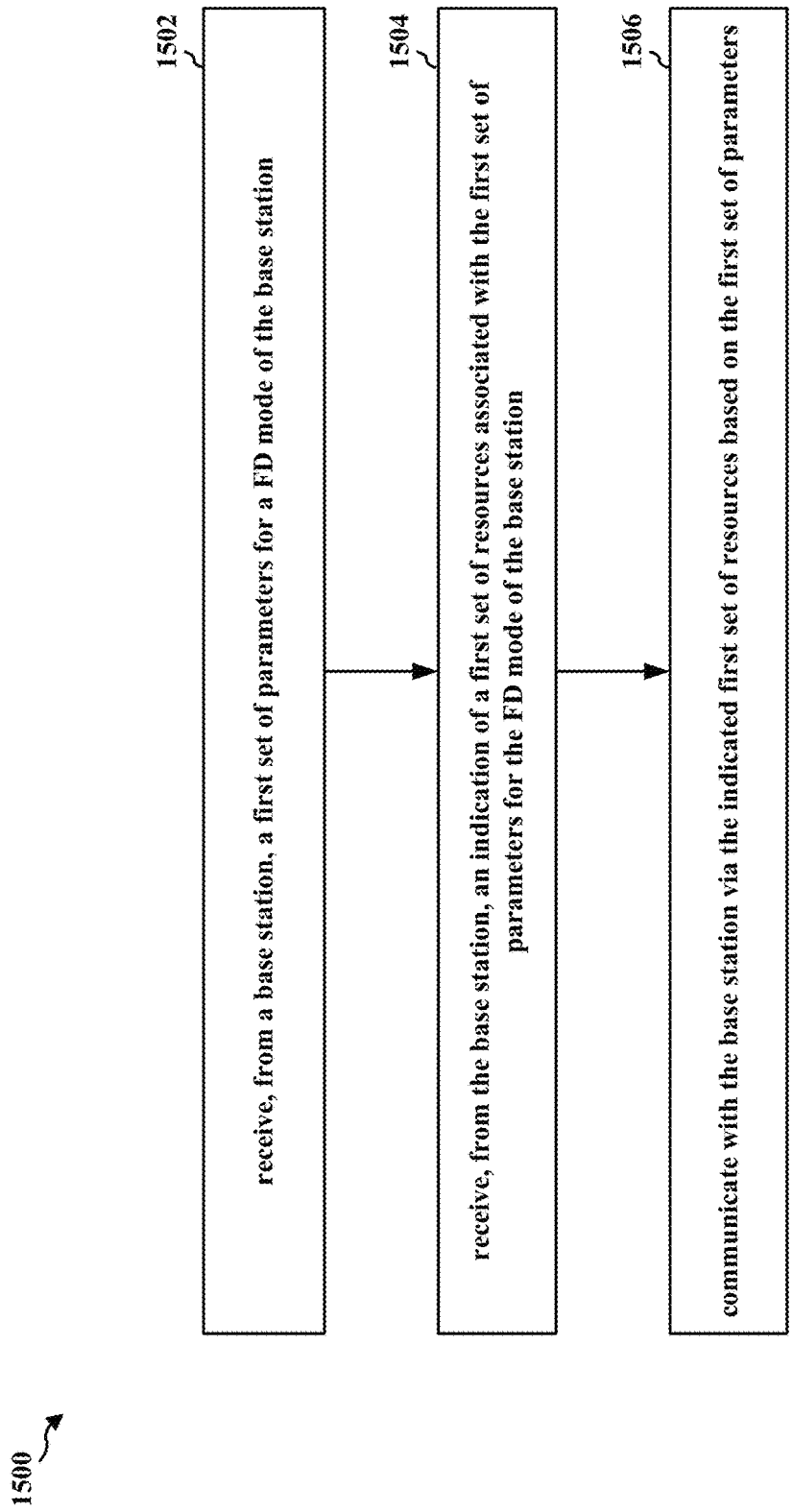
FIG. 15 is a flowchart of a method of wireless communication in accordance with various aspects of the present disclosure.

FIG. 15 is a flowchart 1500 of a method of wireless communication. The method may be performed by a UE (e.g., the UE 104, 602, 606, 702, or 706; the apparatus 1702). At 1502, the UE may receive, from a base station, a first set of parameters for a full-duplex mode of the base station. For example, 1502 may be performed by FD/HD mode configuration reception component 1740. In some aspects, the first set of parameters includes at least one of a transmission power, a transmission beam, a precoder, a rank indicator, a modulation and coding scheme, or a timing advance. In some aspects, the UE may also receive, from the base station, a second set of parameters for a half-duplex mode of the base station. The first set of resources associated with the first set of parameters for the full-duplex mode, in some aspects, includes a first set of time resources associated with a data transmission to the UE and a data reception, at the base station, from a second UE. For example, referring to FIG. 7, the UE 702 (or 706) may receive FD/HD Mode parameter configuration 710A (or 710B).

At 1504, the UE may receive, from the base station, an indication of a first set of resources associated with the first set of parameters for the full-duplex mode of the base station. For example, 1504 may be performed by FD/HD mode configuration reception component 1740. The first set of resources may include one or more scheduled (e.g., periodic or aperiodic) sets of time-domain resources (e.g., frames, slots, symbols, etc.) associated with the full-duplex mode. In some aspects, the UE may also receive, from the base station, an indication of a second set of resources associated with the second set of parameters for the half-duplex mode of the base station. For example, referring to FIG. 7, the UE 702 (or 706) may receive FD/HD mode parameter configurations 710A (or 710B) including an indication of the first set of resources associated with the first set of parameters for the full-duplex mode of the base station.

Finally, at 1506, the UE may communicate with the base station via the indicated first set of resources based on the first set of parameters. For example, 1506 may be performed by FD communication component 1742. In some aspects, the UE determines a first subset of resources to use for a calibration operation associated with the full-duplex mode communication via the first set of resources. For example, referring to FIGS. 8A and 8B, the UE may determine to use symbol 820 or partial symbol 862 to perform a calibration operation (e.g., an AGC or tracking loop). The first subset of resources, in some aspects, may be determined based on one of an indication from the base station, a known resource allocation, or autonomously at the first UE. The UE may receive a DL data transmission from the base station in the set of time resources via the first set of resources. For example, referring to FIG. 7, the UE 702 may receive, from the base station 704, DL transmission 720A (e.g., via the first set of resources) or the UE 706 may transmit, to the base station 704, UL transmission 720B (e.g., via a third set of resources) during a same, or overlapping, set of time resources (e.g., a set of time resources included in the first set of resources and the third set of resources).

Figure 16:
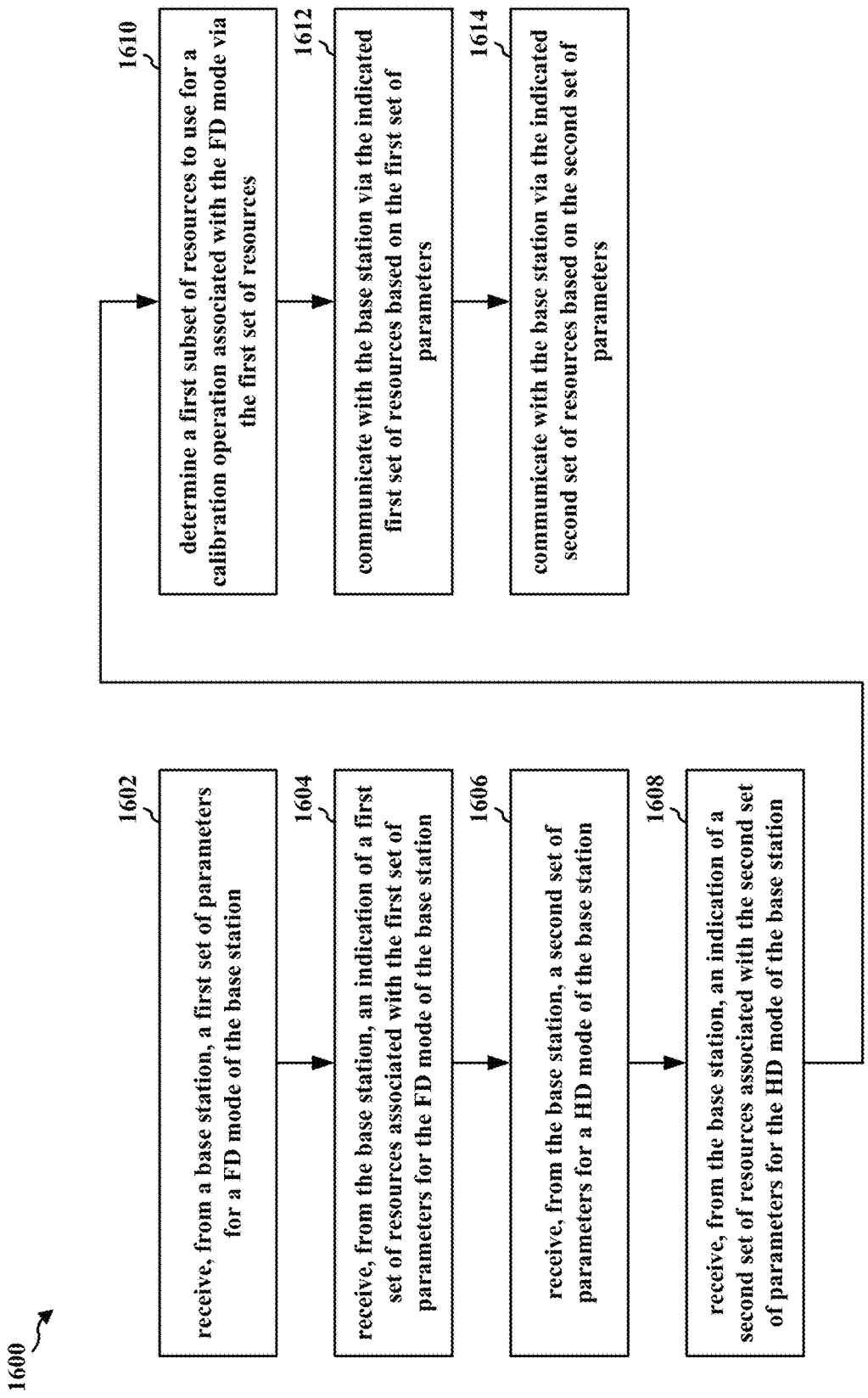
FIG. 16 is a flowchart of a method of wireless communication in accordance with various aspects of the present disclosure.

FIG. 16 is a flowchart 1600 of a method of wireless communication. The method may be performed by a UE (e.g., the UE 104, 602, 606, 702, or 706; the apparatus 1702). At 1602, the UE may receive, from a base station, a first set of parameters for a full-duplex mode of the base station. For example, 1602 may be performed by FD/HD mode configuration reception component 1740. In some aspects, the first set of parameters includes at least one of a transmission power, a transmission beam, a precoder, a rank indicator, a modulation and coding scheme, or a timing advance. The first set of resources associated with the first set of parameters for the full-duplex mode, in some aspects, includes a first set of time resources associated with a data transmission to the UE and a data reception, at the base station, from a second UE. For example, referring to FIG. 7, the UE 702 (or 706) may receive FD/HD Mode parameter configuration 710A (or 710B).

At 1604, the UE may receive, from the base station, an indication of a first set of resources associated with the first set of parameters for the full-duplex mode of the base station. For example, 1604 may be performed by FD/HD mode configuration reception component 1740. The first set of resources may include one or more scheduled (e.g., periodic or aperiodic) sets of time-domain resources (e.g., frames, slots, symbols, etc.) associated with the full-duplex mode. For example, referring to FIG. 7, the UE 702 (or 706) may receive FD/HD mode parameter configurations 710A (or 710B) including an indication of the first set of resources associated with the first set of parameters for the full-duplex mode of the base station.

At 1606, the UE may receive, from the base station, a second set of parameters for a half-duplex mode of the base station. For example, 1606 may be performed by FD/HD mode configuration reception component 1740. In some aspects, the second set of parameters includes at least one of a transmission power, a transmission beam, a precoder, a rank indicator, a modulation and coding scheme, or a timing advance. In some aspects, a value associated with a first set of parameters is different than a corresponding parameter in the second set of parameters. The second set of resources associated with the second set of parameters for the full-duplex mode, in some aspects, includes a second set of time resources associated with a data transmission to the UE. For example, referring to FIG. 7, the UE 702 (or 706) may receive FD/HD Mode parameter configuration 710A (or 710B).

At 1608, the UE may receive, from the base station, an indication of a second set of resources associated with the second set of parameters for the half-duplex mode of the base station. For example, 1608 may be performed by FD/HD mode configuration reception component 1740. For example, referring to FIG. 7, the UE 702 (or 706) may receive FD/HD mode parameter configurations 710A (or 710B) including an indication of the second set of resources associated with the second set of parameters for the half-duplex mode of the base station.

At 1610, the UE may determine a first subset of resources to use for a calibration operation associated with the full-duplex mode communication via the first set of resources. For example, 1610 may be performed by FD communication component 1742. For example, referring to FIGS. 8A and 8B, the UE may determine to use symbol 820 or partial symbol 862 to perform a calibration operation (e.g., an AGC or tracking loop).

At 1612, the UE may communicate with the base station via the indicated first set of resources based on the first set of parameters. For example, 1612 may be performed by FD communication component 1742. The first subset of resources, in some aspects, may be determined based on one of an indication from the base station, a known resource allocation, or autonomously at the first UE. The UE may receive a DL data transmission from the base station in the set of time resources via the first set of resources. For example, referring to FIG. 7, the UE 702 may receive, from the base station 704, DL transmission 720A (e.g., via the first set of resources) or the UE 706 may transmit, to the base station 704, UL transmission 720B (e.g., via a third set of resources) during a same, or overlapping, set of time resources (e.g., a set of time resources included in the first set of resources and the third set of resources).

Figure 17:
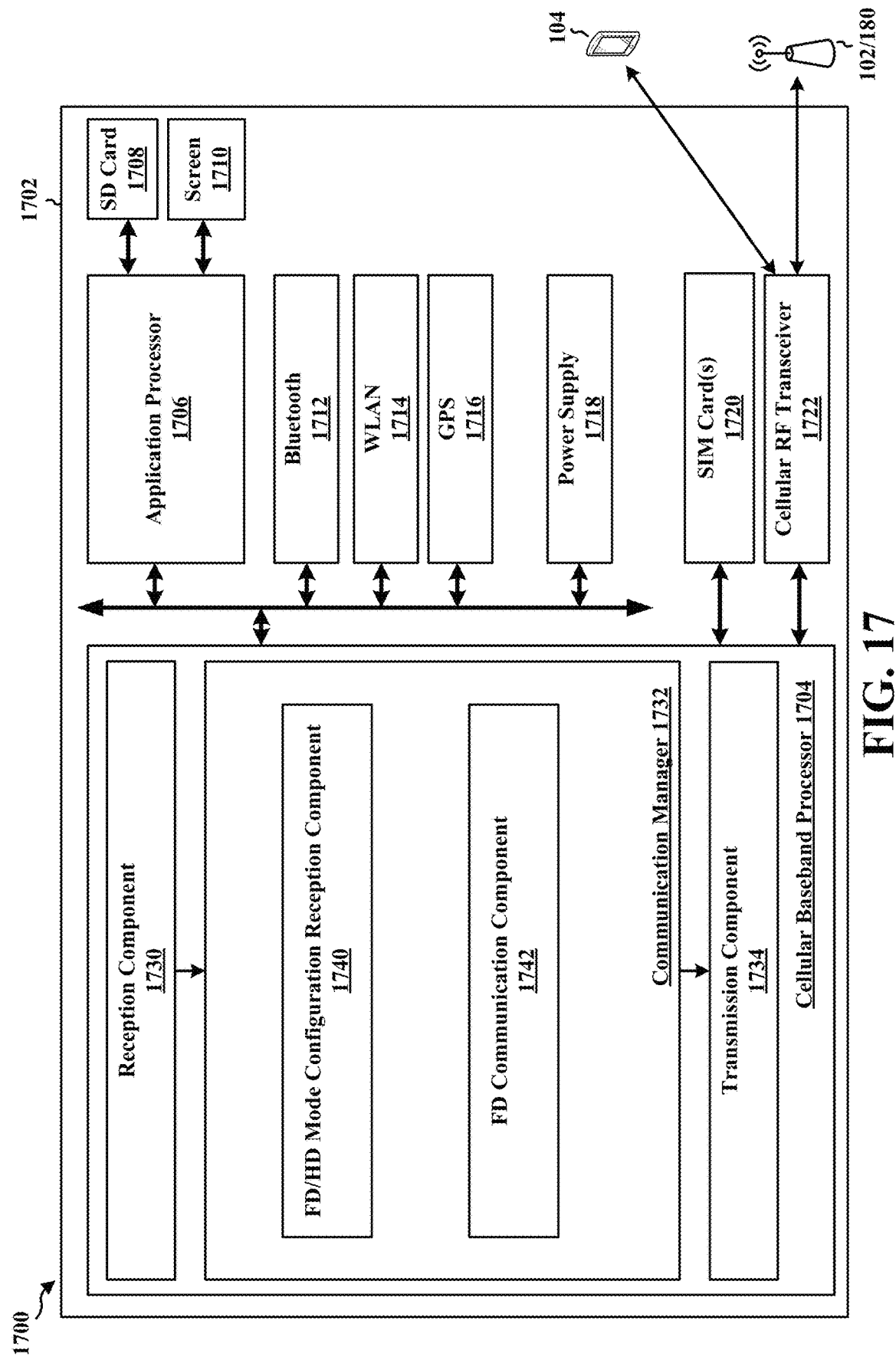
FIG. 17 is a diagram illustrating an example of a hardware implementation for an apparatus in accordance with various aspects of the present disclosure.

Finally, at 1614, the UE may communicate with the base station via the indicated second set of resources based on the second set of parameters. For example, 1614 may be performed by FD communication component 1742. For example, referring to FIG. 7, the UE 702 may receive, from the base station 704, DL transmission 712 (e.g., via the second set of resources) or the UE 706 may transmit, to the base station 704, UL transmission 714 (e.g., via a third set of resources) during disjoint sets of time resources. FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a cellular baseband processor 1704 (also referred to as a modem) coupled to a cellular RF transceiver 1722. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes a FD/HD mode configuration reception component 1740 that is configured to receive, from a base station, a configuration of a downlink BWP and an uplink BWP having at least one of a restricted uplink portion, a restricted downlink portion, or a guard band associated with one or more of the downlink BWP or the uplink BWP; receive, from the base station, an indication of the at least one of the restricted uplink portion associated with the uplink BWP, the restricted downlink portion associated with the downlink BWP, or the guard band that is between the restricted uplink portion and the restricted downlink portion; receive, from the base station, information indicating, the period of time or the pattern of the time resources associated with the one or more of the restricted uplink portion, the restricted downlink portion, or the guard band; receive, from the base station, an indication of an adjustment to a number of subcarriers in the first subset of subcarriers of the restricted downlink portion of the downlink bandwidth part; receive, from a base station, a first set of parameters for a full-duplex mode of the base station; receive, from the base station, an indication of a first set of resources associated with the first set of parameters for the full-duplex mode of the base station; and receive, from the base station, a second set of parameters for a half-duplex mode of the base station; receive, from the base station, an indication of a second set of resources associated with the second set of parameters for the half-duplex mode of the base station, e.g., as described in connection with 1302, 1402, 1404, 1406, 1410, 1502, 1504, 1602, 1604, 1606, and 1608 of FIGS. 13-16. The communication manager 1732 further includes a FD communication component 1742 that receives input in the form of a resource configuration for a FD (and, in some aspects, a HD) mode at the base station from the FD/HD mode configuration reception component 1740 and is configured to communicate with the base station in one or more of the restricted downlink portion of the downlink BWP or the restricted uplink portion of the uplink BWP (with or without an adjustment), communicate with the base station (e.g., with the base station operating in a full-duplex mode) via the indicated first set of resources based on the first set of parameters, determine a first subset of resources to use for a calibration operation associated with the full-duplex mode communication via the first set of resources, and communicate with the base station (e.g., with the base station operating in a half-duplex mode) via the indicated second set of resources based on the second set of parameters, e.g., as described in connection with 1304, 1408, 1412, 1506, 1610, 1612, and 1614 of FIGS. 13-16.

The apparatus may include additional components that perform each of the blocks of the algorithm in the flowcharts of FIGS. 13-16. As such, each block in the flowcharts of FIGS. 13-16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the cellular baseband processor 1704, includes means for receiving, from a base station, a configuration of a downlink BWP and an uplink BWP having at least one of a restricted uplink portion, a restricted downlink portion, or a guard band associated with one or more of the downlink BWP or the uplink BWP. The apparatus 1702, and in particular the cellular baseband processor 1704, may include means for communicating with the base station in one or more of the restricted downlink portion of the downlink BWP or the restricted uplink portion of the uplink BWP. The apparatus 1702, and in particular the cellular baseband processor 1704, may include means for receiving, from the base station, an indication of the at least one of the restricted uplink portion associated with the uplink BWP, the restricted downlink portion associated with the downlink BWP, or the guard band that is between the restricted uplink portion and the restricted downlink portion. The apparatus 1702, and in particular the cellular baseband processor 1704, may include means for receiving, from the base station, an indication of an adjustment to a number of subcarriers in the first subset of subcarriers of the restricted downlink portion of the downlink BWP. The apparatus 1702, and in particular the cellular baseband processor 1704, may include means for receiving, based on the received indication of the adjustment, a DL transmission from the base station via the restricted downlink portion with the adjustment. The apparatus 1702, and in particular the cellular baseband processor 1704, may include means for receiving, from the base station, information indicating, the period of time or the pattern of the time resources associated with the one or more of the restricted uplink portion, the restricted downlink portion, or the guard band. The apparatus 1702, and in particular the cellular baseband processor 1704, may include means for receiving, from a base station, a first set of parameters for a full-duplex mode of the base station. The apparatus 1702, and in particular the cellular baseband processor 1704, may include means for receiving, from the base station, an indication of a first set of resources associated with the first set of parameters for the full-duplex mode of the base station. The apparatus 1702, and in particular the cellular baseband processor 1704, may include means for communicating with the base station via the indicated first set of resources based on the first set of parameters. The apparatus 1702, and in particular the cellular baseband processor 1704, may include means for determining a first subset of resources to use for a calibration operation associated with the full-duplex mode via the first set of resources, where the first subset of resources is determined based on one of an indication from the base station, a known resource allocation, or autonomously at the first UE. The apparatus 1702, and in particular the cellular baseband processor 1704, may further include means for receiving, from the base station, a second set of parameters for a half-duplex mode of the base station. The apparatus 1702, and in particular the cellular baseband processor 1704, may include means for receiving, from the base station, an indication of a second set of resources associated with the second set of parameters for the half-duplex mode of the base station. The apparatus 1702, and in particular the cellular baseband processor 1704, may include means for communicating with the base station via the indicated second set of resources based on the second set of parameters. The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
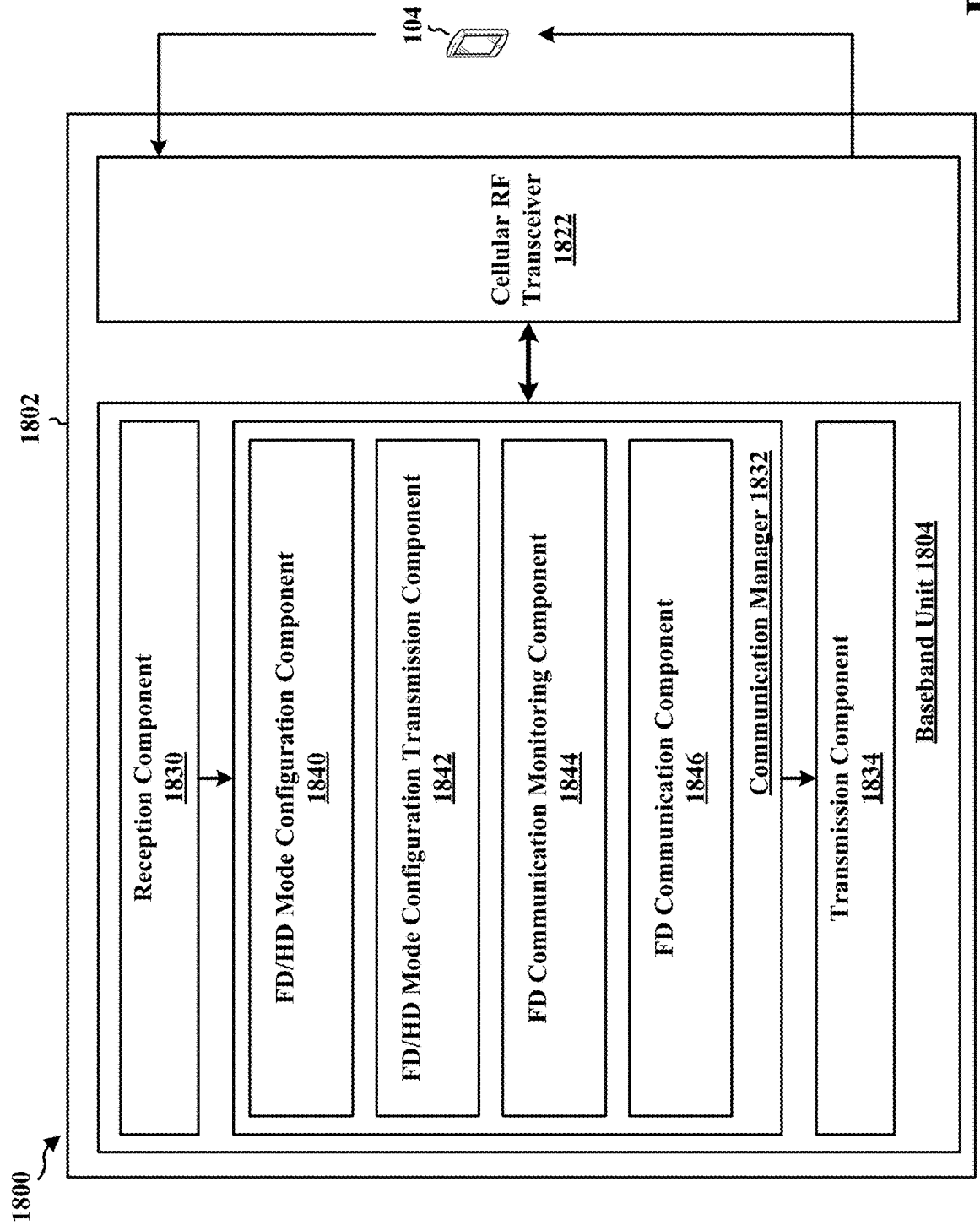
FIG. 18 is a diagram illustrating an example of a hardware implementation for an apparatus in accordance with various aspects of the present disclosure.

FIG. 18 is a diagram 1800 illustrating an example of a hardware implementation for an apparatus 1802. The apparatus 1802 may be a base station, a component of a base station, or may implement base station functionality. In some aspects, the apparatus 1702 may include a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the base station 310 and may include the memory 376 and/or at least one of the TX processor 316, the RX processor 370, and the controller/processor 375.

The communication manager 1832 includes a FD/HD mode configuration component 1840 that may be configured to configure a downlink BWP and an uplink BWP having at least one of a restricted uplink portion, a restricted downlink portion, or a guard band associated with one or more of the downlink BWP or the uplink BWP; adjust, based on a self-interference of at least one of the base station or the one or more UEs, at least one of (1) a first number of subcarriers in the first subset of subcarriers in the restricted downlink portion of the downlink BWP or (2) a second number of subcarriers in the second non-overlapping subset of subcarriers comprising the restricted uplink portion of the uplink BWP; and configure a first set of parameters for a full-duplex mode of the base station and a second set of parameters for a half-duplex mode of the base station, e.g., as described in connection with 902, 1002, 1012, and 1202 of FIGS. 9, 10, and 12. The communication manager 1832 further includes a component 1842 that may be configured to transmit an indication of the at least one of the restricted uplink portion associated with the uplink BWP, the restricted downlink portion associated with the downlink BWP, or the guard band that is between the restricted uplink portion and the restricted downlink portion; indicate, to one or more UEs, a period of time or a pattern of time resources associated with the one or more of the restricted uplink portion, the restricted downlink portion, or the guard band; and transmit, to a first UE in a half-duplex mode of operation, an indication of a first set of resources for a full-duplex mode of operation of the base station and a second set of resources for the half-duplex mode of operation of the base station, e.g., as described in connection with 1004, 1006, 1102, and 1204 of FIGS. 10-12. The communication manager 1832 further includes a FD communication monitoring component 1844 that may be configured to adjust, based on a self-interference of at least one of the base station or the one or more UEs, at least one of (1) a first number of subcarriers in the first subset of subcarriers in the restricted downlink portion of the downlink BWP or (2) a second number of subcarriers in the second non-overlapping subset of subcarriers comprising the restricted uplink portion of the uplink BWP, e.g., as described in connection with 1012 of FIG. 10. The communication manager 1832 further includes a FD communication component 1846 that may be configured to communicate with one or more UEs in the restricted downlink portion of the downlink BWP and the restricted uplink portion of the uplink BWP, operate in a FDMed full-duplex mode of operation using the downlink BWP and the uplink BWP, and communicate with the first UE in the indicated first set of resources, e.g., as described in connection with 904, 1008, 1010, 1104, and 1206 of FIGS. 9-12.

The apparatus may include additional components that perform each of the blocks of the algorithm in the flowcharts of FIGS. 9-12. As such, each block in the flowcharts of FIGS. 9-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for configuring a downlink BWP and an uplink BWP having at least one of a restricted uplink portion, a restricted downlink portion, or a guard band associated with one or more of the downlink BWP or the uplink BWP. The apparatus 1802, and in particular the baseband unit 1804, may include means for transmitting an indication of the at least one of the restricted uplink portion associated with the uplink BWP, the restricted downlink portion associated with the downlink BWP, or the guard band that is between the restricted uplink portion and the restricted downlink portion. The apparatus 1802, and in particular the baseband unit 1804, may include means for adjusting, based on a self-interference of at least one of the base station or the one or more UEs, at least one of (1) a first number of subcarriers in the first subset of subcarriers in the restricted downlink portion of the downlink BWP or (2) a second number of subcarriers in the second non-overlapping subset of subcarriers including the restricted uplink portion of the uplink BWP. The apparatus 1802, and in particular the baseband unit 1804, may include means for operating in a frequency-domain-multiplexed full-duplex mode of operation using the downlink BWP and the uplink BWP. The apparatus 1802, and in particular the baseband unit 1804, may include means for indicating, to the one or more UEs, a period of time or a pattern of time resources associated with the one or more of the restricted uplink portion, the restricted downlink portion, or the guard band. The apparatus 1802, and in particular the baseband unit 1804, may include means for transmitting, to a first UE in a half-duplex mode of operation, an indication of a first set of resources for a full-duplex mode of operation of the base station and a second set of resources for the half-duplex mode of operation of the base station. The apparatus 1802, and in particular the baseband unit 1804, may include means for communicating with the first UE in the indicated first set of resources. The apparatus 1802, and in particular the baseband unit 1804, may include means for configuring a first set of parameters for the full-duplex mode of the base station and a second set of parameters for the half-duplex mode of the base station, where the first set of parameters includes at least one of a transmission power, a transmission beam, a precoder, a rank indicator, a modulation and coding scheme, or a timing advance, where at least one value in the first set of parameters is different from a corresponding parameter value in the second set of parameters. The means may be one or more of the components of the apparatus 1802 configured to perform the functions recited by the means. As described supra, the apparatus 1802 may include the TX Processor 316, the RX Processor 370, and the controller/processor 375. As such, in one configuration, the means may be the TX Processor 316, the RX Processor 370, and the controller/processor 375 configured to perform the functions recited by the means.

In some aspects of wireless communication, a base station may engage in FD communication with one or more UEs. The base station (or the UE) may engage in FD communication based on DL transmission (or reception) via a first antenna or panel and UL reception (or transmission) via a second antenna or panel. The base station, in some aspects, may transmit DL transmissions to a first UE operating in half-duplex (HD) mode and receive UL transmissions from a second UE operating in a half-duplex mode. In some aspects, the capacity for FD operation may be affected by self-interference from the DL transmission to UL reception. The methods, computer-readable media, and apparatuses described herein provide enhanced spectrum efficiency, e.g., by dynamically adjusting frequency resource allocation based on self-interference to avoid performance issues associated with operating a base station in a full-duplex mode in communication with different UEs operating in a half-duplex mode. The adjustment may be at a cell level or at a UE level to further enhance the spectrum efficiency. Additionally, in some aspects, it is possible to receive a DL transmission in a UL slot.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to configure a downlink BWP and an uplink BWP having at least one of a restricted uplink portion, a restricted downlink portion, or a guard band associated with one or more of the downlink BWP or the uplink BWP; and communicate with one or more UEs in the restricted downlink portion of the downlink BWP and the restricted uplink portion of the uplink BWP.

Aspect 2 is the apparatus of aspect 1, the at least one processor further configured to transmit an indication of the at least one of the restricted uplink portion associated with the uplink BWP, the restricted downlink portion associated with the downlink BWP, or the guard band that is between the restricted uplink portion and the restricted downlink portion.

Aspect 3 is the apparatus of any of aspects 1 and 2, where the at least one of the restricted uplink portion, the restricted downlink portion, or the guard band is based on a rule associated with one or more of the downlink BWP or the uplink BWP.

Aspect 4 is the apparatus of any of aspects 1 to 3, where communicating with the one or more UEs includes transmitting a downlink transmission to a first UE in the restricted downlink portion of the downlink BWP and receiving an uplink transmission from a second UE in the restricted uplink portion of the uplink BWP.

Aspect 5 is the apparatus of any of aspects 1 to 4, where the restricted downlink portion includes a first subset of subcarriers in the downlink BWP and the restricted uplink portion includes a second non-overlapping subset of subcarriers in the uplink BWP Aspect 6 is the apparatus of aspect 5, where the restricted downlink portion of the downlink BWP and the restricted uplink portion of the uplink BWP are separated by the guard band including a third set of subcarriers between the first subset of subcarriers and the second non-overlapping subset of subcarriers.

Aspect 7 is the apparatus of any of aspects 5 and 6, where the downlink BWP and the uplink BWP are configured for a first cell including a first UE and a second UE.

Aspect 8 is the apparatus of aspect 7, the at least one processor further configured to adjust, based on a self-interference of at least one of the base station or the one or more UEs, at least one of (1) a first number of subcarriers in the first subset of subcarriers in the restricted downlink portion of the downlink BWP or (2) a second number of subcarriers in the second non-overlapping subset of subcarriers including the restricted uplink portion of the uplink BWP.

Aspect 9 is the apparatus of aspect 8, the at least one processor is configured to adjust the at least one of the first number of subcarriers in the first subset of subcarriers or the second number of subcarriers in the second non-overlapping subset of subcarriers based on the self-interference of at least one of the base station or the one or more UEs by one of increasing at least one of the first number of subcarriers in the first subset of subcarriers or the second number of subcarriers in the second non-overlapping subset of subcarriers based on the self-interference being below a first threshold; and decreasing at least one of the first number of subcarriers in the first subset of subcarriers or the second number of subcarriers in the second non-overlapping subset of subcarriers based on the self-interference being above a second threshold.

Aspect 10 is the apparatus of any of aspects 1 to 9, further including a transceiver coupled to the at least one processor, the at least one processor further configured to operate in a frequency-domain-multiplexed full-duplex mode of operation using the downlink BWP and the uplink BWP.

Aspect 11 is the apparatus of any of aspects 1 to 10, the at least one processor further configured to indicate, to the one or more UEs, a period of time or a pattern of time resources associated with the one or more of the restricted uplink portion, the restricted downlink portion, or the guard band.

Aspect 12 is the apparatus of any of aspects 1 to 11, the uplink BWP is at least one of included in the downlink BWP, partially overlapping with the downlink BWP, or separated from the downlink BWP by the guard band.

Aspect 13 is an apparatus for wireless communication including at least one processor coupled to a memory and configured to transmit, to a first UE in a half-duplex mode of operation, an indication of a first set of resources for a full-duplex mode of operation of the base station and a second set of resources for the half-duplex mode of operation of the base station; and communicate with the first UE in the indicated first set of resources.

Aspect 14 is the apparatus of aspect 13, the at least one processor further configured to configure a first set of parameters for the full-duplex mode of the base station and a second set of parameters for the half-duplex mode of the base station, where the first set of parameters includes at least one of a transmission power, a transmission beam, a precoder, a rank indicator, a modulation and coding scheme, or a timing advance, where at least one value in the first set of parameters is different from a corresponding parameter value in the second set of parameters.

Aspect 15 is the apparatus of aspect 14, where the first set of resources associated with the first set of parameters for the full-duplex mode includes a set of time resources associated with a data transmission to the first UE and a data reception from a second UE.

Aspect 16 is the apparatus of any of aspects 13 to 15, further including a transceiver coupled to the at least one processor.

Aspect 17 is an apparatus for wireless communication including at least one processor coupled to a memory and configured to receive, from a base station, a configuration of a downlink BWP and an uplink BWP having at least one of a restricted uplink portion, a restricted downlink portion, or a guard band associated with one or more of the downlink BWP or the uplink BWP; and communicate with the base station in one or more of the restricted downlink portion of the downlink BWP or the restricted uplink portion of the uplink BWP.

Aspect 18 is the apparatus of aspect 17, the at least one processor further configured to receive, from the base station, an indication of the at least one of the restricted uplink portion associated with the uplink BWP, the restricted downlink portion associated with the downlink BWP, or the guard band that is between the restricted uplink portion and the restricted downlink portion.

Aspect 19 is the apparatus of any of aspect 17 and 18, where the at least one of the restricted uplink portion, the restricted downlink portion, or the guard band is based on a rule associated with one or more of the downlink BWP or the uplink BWP.

Aspect 20 is the apparatus of any of aspect 17 to 19, where the restricted downlink portion of the downlink BWP includes a first subset of subcarriers in the BWP.

Aspect 21 is the apparatus of aspect 20, the at least one processor further configured to receive, from the base station, an indication of an adjustment to a number of subcarriers in the first subset of subcarriers of the restricted downlink portion of the downlink BWP; and receive, based on the received indication of the adjustment, a DL transmission from the base station via the restricted downlink portion with the adjustment.

Aspect 22 is the apparatus of any of aspect 17 to 19, where the one or more of the restricted uplink portion, the restricted downlink portion, or the guard band are associated with a period of time or a pattern of time resources.

Aspect 23 is the apparatus of aspect 22, further including a transceiver coupled to the at least one processor, the at least one processor further configured to receive, from the base station, information indicating, the period of time or the pattern of the time resources associated with the one or more of the restricted uplink portion, the restricted downlink portion, or the guard band.

Aspect 24 is an apparatus for wireless communication including at least one processor coupled to a memory and configured to receive, from a base station, a first set of parameters for a full-duplex mode of the base station; receive, from the base station, an indication of a first set of resources associated with the first set of parameters for the full-duplex mode of the base station; and communicate with the base station via the indicated first set of resources based on the first set of parameters.

Aspect 25 is the apparatus of aspect 24, the at least one processor further configured to determine a first subset of resources to use for a calibration operation associated with the full-duplex mode via the first set of resources, where the first subset of resources is determined based on one of an indication from the base station, a known resource allocation, or autonomously at the first UE.

Aspect 26 is the apparatus of any of aspect 24 and 25, the at least one processor further configured to receive, from the base station, a second set of parameters for a half-duplex mode of the base station; receive, from the base station, an indication of a second set of resources associated with the second set of parameters for the half-duplex mode of the base station; and communicate with the base station via the indicated second set of resources based on the second set of parameters.

Aspect 27 is the apparatus of aspect 26, where the first set of parameters includes at least one of a transmission power, a transmission beam, a precoder, a rank indicator, a modulation and coding scheme, or a timing advance.

Aspect 28 is the apparatus of aspect 27, where a value associated with a first set of parameters is different than a corresponding parameter in the second set of parameters.

Aspect 29 is the apparatus of any of aspect 27 and 28, where the first set of resources associated with the first set of parameters for the full-duplex mode includes a first set of time resources associated with a data transmission to the first UE and a data reception from a second UE.

Aspect 30 is the apparatus of any of aspects 24 to 29, further including a transceiver coupled to the at least one processor.

Aspect 31 is a method of wireless communication for implementing any of aspects 1 to 30.

Aspect 32 is an apparatus for wireless communication including means for implementing any of aspects 1 to 30.

Aspect 33 is a computer-readable medium storing computer executable code, where the code when executed by a processor causes the processor to implement any of aspects 1 to 30.

What is claimed is:

1. An apparatus for wireless communication at a base station, comprising:
    a memory; and
    at least one processor coupled to the memory and configured to:
        configure a downlink bandwidth part (BWP) and an uplink BWP wherein the downlink BWP has a restricted downlink portion, the uplink BWP has a restricted uplink portion, and a guard band is associated with the downlink BWP and the uplink BWP
        wherein the restricted downlink portion comprises a first subset of subcarriers in the downlink BWP and the restricted uplink portion comprises a second non-overlapping subset of subcarriers in the uplink BWP and wherein the restricted downlink portion of the downlink BWP and the restricted uplink portion of the uplink BWP are separated by the guard band including a third set of subcarriers between the first subset of subcarriers and the second non-overlapping subset of subcarriers; and
        communicate with one or more user equipments (UEs) in the restricted downlink portion of the downlink BWP and the restricted uplink portion of the uplink BWP.

2. The apparatus of claim 1, the at least one processor further configured to:
    transmit an indication of the at least one of the restricted uplink portion associated with the uplink BWP, the restricted downlink portion associated with the downlink BWP, or the guard band that is between the restricted uplink portion and the restricted downlink portion.

3. The apparatus of claim 1, wherein the at least one of the restricted uplink portion, the restricted downlink portion, or the guard band is based on a rule associated with one or more of the downlink BWP or the uplink BWP.

4. The apparatus of claim 1, wherein communicating with the one or more UEs includes transmitting a downlink transmission to a first UE in the restricted downlink portion of the downlink BWP and receiving an uplink transmission from a second UE in the restricted uplink portion of the uplink BWP.

5. The apparatus of claim 1, further comprising a transceiver coupled to the at least one processor, the at least one processor further configured to:
    operate in a frequency-domain-multiplexed full-duplex mode of operation using the downlink BWP and the uplink BWP.

6. The apparatus of claim 1, the at least one processor further configured to:
    indicate, to the one or more UEs, a period of time or a pattern of time resources associated with the one or more of the restricted uplink portion, the restricted downlink portion, or the guard band.

7. The apparatus of claim 1, wherein the uplink BWP is at least one of included in the downlink BWP, partially overlapping with the downlink BWP, or separated from the downlink BWP by the guard band.

8. The apparatus of claim 1, wherein the downlink BWP and the uplink BWP are configured for a first cell including a first UE and a second UE.

9. The apparatus of claim 8, the at least one processor further configured to:
adjust, based on a self-interference of at least one of the base station or the one or more UEs, at least one of (1) a first number of subcarriers in the first subset of subcarriers in the restricted downlink portion of the downlink BWP or (2) a second number of subcarriers in the second non-overlapping subset of subcarriers comprising the restricted uplink portion of the uplink BWP.

10. The apparatus of claim 9, wherein the at least one processor is configured to adjust the at least one of the first number of subcarriers in the first subset of subcarriers or the second number of subcarriers in the second non-overlapping subset of subcarriers based on the self-interference of at least one of the base station or the one or more UEs by one of:
increasing at least one of the first number of subcarriers in the first subset of subcarriers or the second number of subcarriers in the second non-overlapping subset of subcarriers based on the self-interference being below a first threshold; and
decreasing at least one of the first number of subcarriers in the first subset of subcarriers or the second number of subcarriers in the second non-overlapping subset of subcarriers based on the self-interference being above a second threshold.

11. An apparatus for wireless communication at a user equipment (UE), comprising:
a memory; and
at least one processor coupled to the memory and configured to:
receive, from a base station, a configuration of a downlink bandwidth part (BWP) and an uplink BWP wherein the downlink BWP has a restricted downlink portion, the uplink BWP has a restricted uplink portion, and a guard band is associated with the downlink BWP and the uplink BWP;
receive, from the base station, an indication of an adjustment to a number of subcarriers in the first subset of subcarriers of the restricted downlink portion of the downlink BWP;
receive, based on the received indication of the adjustment, a DL transmission from the base station via the restricted downlink portion with the adjustment; and
communicate with the base station in one or more of the restricted downlink portion of the downlink BWP or the restricted uplink portion of the uplink BWP.

12. The apparatus of claim 11, the at least one processor further configured to:
receive, from the base station, an indication of the at least one of the restricted uplink portion associated with the uplink BWP, the restricted downlink portion associated with the downlink BWP, or the guard band that is between the restricted uplink portion and the restricted downlink portion.

13. The apparatus of claim 11, wherein the at least one of the restricted uplink portion, the restricted downlink portion, or the guard band is based on a rule associated with one or more of the downlink BWP or the uplink BWP.

14. The apparatus of claim 11, wherein the restricted downlink portion of the downlink BWP comprises a first subset of subcarriers in the BWP.

15. The apparatus of claim 11, wherein the one or more of the restricted uplink portion, the restricted downlink portion, or the guard band are associated with a period of time or a pattern of time resources.

16. The apparatus of claim 15, further comprising a transceiver coupled to the at least one processor, the at least one processor further configured to:
receive, from the base station, information indicating, the period of time or the pattern of the time resources associated with the one or more of the restricted uplink portion, the restricted downlink portion, or the guard band.

* * * * *